US012194465B2

(12) United States Patent
Wunsch et al.

(10) Patent No.: US 12,194,465 B2
(45) Date of Patent: Jan. 14, 2025

(54) STRUCTURES FOR AUTOMATED, MULTI-STAGE PROCESSING OF NANOFLUIDIC CHIPS

(71) Applicant: International Business Machines Corporation, Armonk, NY (US)

(72) Inventors: Benjamin Wunsch, Mt. Kisco, NY (US); Joshua T. Smith, Croton-on-Hudson, NY (US); Stacey Gifford, Fairfield, CT (US); Sung-Cheol Kim, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/062,082

(22) Filed: Dec. 6, 2022

(65) Prior Publication Data

US 2023/0107476 A1 Apr. 6, 2023

Related U.S. Application Data

(62) Division of application No. 16/203,171, filed on Nov. 28, 2018, now Pat. No. 11,548,000.

(51) Int. Cl.
*B01L 3/00* (2006.01)

(52) U.S. Cl.
CPC ..... *B01L 3/50273* (2013.01); *B01L 2200/027* (2013.01); *B01L 2200/0642* (2013.01);
(Continued)

(58) Field of Classification Search
CPC ..... B01L 2300/0816; B01L 2300/0896; B01L 2400/0481; B01L 2400/0475;
(Continued)

(56) References Cited

U.S. PATENT DOCUMENTS

| | | | |
|---|---|---|---|
| 6,086,825 | A | 7/2000 | Sundberg et al. |
| 7,666,687 | B2 | 2/2010 | Webster et al. |

(Continued)

FOREIGN PATENT DOCUMENTS

| | | | |
|---|---|---|---|
| CN | 107076763 | A | 8/2017 |
| DE | 102016220803 | A1 | 5/2017 |

(Continued)

OTHER PUBLICATIONS

Wunsch, et al., "Nanoscale Lateral Displacement Arrays for the Separation of Exosomes and Colloids Down to 20 nm", Nature Nanotechnology, 2016, 7 pages.

(Continued)

*Primary Examiner* — Rebecca M Fritchman
(74) *Attorney, Agent, or Firm* — Amin, Turocy & Watson, LLP

(57) ABSTRACT

Techniques regarding one or more structures that can facilitate automated, multi-stage processing of one or more nanofluidic chips are provided. For example, one or more embodiments described herein can comprise a system, which can comprise a roller positioned adjacent to a microfluidic card comprising a plurality of fluid reservoirs in fluid communication with a plurality of nanofluidic chips. An arrangement of the plurality of nanofluidic chips on the microfluidic card can defines a processing sequence driven by a translocation of the roller across the microfluidic card.

8 Claims, 14 Drawing Sheets

(52) U.S. Cl.
CPC ... *B01L 2300/06* (2013.01); *B01L 2300/0877* (2013.01); *B01L 2300/0896* (2013.01); *B01L 2300/123* (2013.01); *B01L 2300/14* (2013.01); *B01L 2400/0475* (2013.01); *B01L 2400/08* (2013.01)

(58) Field of Classification Search
CPC ......... B01L 2300/14; B01L 2200/0642; B01L 2300/123; B01L 2400/0655; B01L 2200/027; B01L 2300/0877; B01L 3/50273; B01L 2400/08; B01L 2300/06
See application file for complete search history.

(56) References Cited

U.S. PATENT DOCUMENTS

| | | | |
|---|---|---|---|
| 8,518,328 B2 | 8/2013 | Padmanabhan et al. | |
| 9,636,675 B2 | 5/2017 | Astier et al. | |
| 9,700,891 B2 | 7/2017 | Smith et al. | |
| 9,833,782 B2 | 12/2017 | Smith et al. | |
| 9,868,119 B2 | 1/2018 | Astier et al. | |
| 2004/0147014 A1 | 7/2004 | Ikuta | |
| 2006/0122048 A1 | 6/2006 | Hlavinka et al. | |
| 2007/0062583 A1* | 3/2007 | Cox ................ | G01N 27/44769 73/864.22 |
| 2011/0256551 A1 | 10/2011 | Linder et al. | |
| 2015/0159195 A1 | 6/2015 | Leclipteux et al. | |
| 2016/0122686 A1 | 5/2016 | Dietz | |
| 2017/0197215 A1* | 7/2017 | Smith ............... | B01L 3/502753 |
| 2017/0205329 A1 | 7/2017 | Astier et al. | |

FOREIGN PATENT DOCUMENTS

| | | | |
|---|---|---|---|
| DE | 112015004553 | T5 | 6/2017 |
| GB | 2548723 | A | 9/2017 |
| JP | 2018506264 | A | 3/2018 |
| WO | 2016083941 | A1 | 6/2016 |

OTHER PUBLICATIONS

Huang, et al. "Continuous Particle Separation Through Deterministic Lateral Displacement", Science, vol. 304, 2004, pp. 987-990.
"Single Layer Nanofluidic Separator Chip and Fluidic Processor", U.S. Appl. No. 15/815,846, filed Nov. 17, 2018, 29 pages.
Non-Final Office Action received for U.S. Appl. No. 16/203,171 dated Jan. 28, 2021, 41 pages.
Final Office Action received for U.S. Appl. No. 16/203,171 dated Aug. 20, 2021, 35 pages.
Non-Final Office Action received for U.S. Appl. No. 16/203,171 dated Dec. 8, 2021, 33 pages.
Final Office Action received for U.S. Appl. No. 16/203,171 dated May 27, 2022, 41 pages.

* cited by examiner

STRUCTURES FOR AUTOMATED, MULTI-STAGE PROCESSING OF NANOFLUIDIC CHIPS

BACKGROUND

The subject disclosure relates to one or more structures that can facilitate automated, multi-stage processing of one or more nanofluidic chips, and more specifically, to one or more structures that can enable automation of sequential operation of one or more nanofluidic chips that require pressure driven flows.

Silicon based, on-chip nanofluidic devices represent a class of lab-on-chip devices with applications in biology, medicine, pharmaceuticals and agriculture. Silicon nanofluidic devices have advantages over their plastic-based counterparts, including scalability, ability to fabricate small feature sizes, and integration with on-chip electronics. Nanoscale deterministic lateral displacement ("nanoDLD") chips are a type of silicon nanofluidic device. NanoDLD consists of asymmetric pillar arrays, with features sizes from 10 to 1,000 nanometers (nm), etched into fluidic channels in a silicon/silica substrate. NanoDLD technology allows size-based fractionation of colloids and sub-cellular components, ranging from 20 to 1,000 nm in diameter. The key design feature of nanoDLD is the gap size, ranging from 50 to 1,000 nm, which controls the size selectivity of the device.

Nanofluidic chips (e.g., comprising nanoDLD technology) operate by using pressure to generate fluid flow through the fluidic channels/pillar arrays. Sample fluid, containing the desired particles to be selected, is pushed through the nanofluidic chip. Chips can range in size from less than 10 millimeters (mm) by 10 mm to wafer level (e.g., having a 200 mm diameter or larger). A flow cell, consisting of a protective housing, tubing and interface connectors, encloses the chip and allows fluid to be injection/extracted. Typically, an external pump or pneumatic source is connected to the flow cell to drive the fluid flow through the nanofluidic chip. A quantity of sample fluid is pressurized through the chip, and the output stream of different particle size fractions are collected in chambers within the flow cell; this is termed processing. Parallel integration of nanoDLD devices for high density chips allows processing rates of about 1 milliliter per hour (mL/hr), thereby enabling nanofluidic chips for medical diagnostic sample sizes.

In several applications, a sample will consist of several different particle sizes, or a spread of particle sizes, requiring a series of nanoDLD gap sizes to be used. In order to carry out these staged separations, in which the output of one nanoDLD device is transferred into another, smaller gap size nanoDLD device, typically an operator must be present to keep timing, manual transfer samples, and to prime chips. This presents a time and cost burden, as well as presents the possibility of reproducibility and uniformity errors.

Additionally, mass transport driven nanofluidic devices, such as nanoDLD, require pressurization to operate, necessitating a mechanical enclosure (flow cell) to provide leak-proof seals between the input sample and the chip. Practically, this means that for every process step that requires a nanofluidic chip, a flow cell and attendant pressure driver are required. Loading and configuring the chip into the flow cell, and manual handling of sample fluids, equates to time and attention an operator must pay to running the devices. For example, some nanoDLD runs can require greater than 60 minutes, and a sequence of 2 or 3 nanoDLD sizing stages can take greater than 4 hours. The requirement of an operator to time and attend to each stage of processing limits the use of these chips for carrying out complex tasks. Manual set-up and handling can also lead to operator error, which can compound through several stages of processing.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, methods, and/or apparatuses that can regard automated, multi-stage processing of one or more nanofluidic chips are described.

According to an embodiment, a system is provided. The system can comprise a roller positioned adjacent to a microfluidic card comprising a plurality of fluid reservoirs in fluid communication with a plurality of nanofluidic chips. An arrangement of the plurality of nanofluidic chips on the microfluidic card can defines a processing sequence driven by a translocation of the roller across the microfluidic card. An advantageous of such a system can be that the processing sequence can initiated automatically by the translocation of the roller.

In some examples, the system can further comprise a holder plate upon which the microfluidic card can be located. The system can also comprise a motor that can drive the holder plate in a conveyance path towards the roller. Further, the system can comprise a controller that controls operation of the motor to drive the translocation of the roller across the microfluidic card. An advantage of such a system can be that the translocation of the roller can be monitored and/or controlled autonomously.

According to an embodiment an apparatus is provided. The apparatus can comprise a nanofluidic chip embedded within a substrate. The apparatus can also comprise an elastomer film disposed onto the nanofluidic chip and the substrate. The elastomer film can define a plurality of fluid reservoirs and a plurality of fluidic channels. Also, the plurality of fluid reservoirs can be in fluid communication with the nanofluidic chip by the plurality of fluidic channels. An advantage of such an apparatus can be that defining the plurality of fluid reservoirs by the elastomer film can facilitate pressurization of the plurality of fluid reservoirs via deformation of the elastomer film.

In some examples, the apparatus can further comprise a second nanofluidic chip embedded within the substrate and in fluid communication with the plurality of fluid reservoirs and the plurality of fluidic channels. A fluid can be transferred from the nanofluidic chip to the second nanofluidic chip by an external force applied to the plurality of fluid reservoirs. An advantage of such an apparatus can be the use of an external force to automate transference of a sample fluid from one nanofluidic processing stage to another.

According to an embodiment a method is provide. The method can comprise pressurizing, by translocating a roller across a microfluidic card, a fluid reservoir comprised within the microfluidic card to supply a sample fluid to a first nanofluidic chip. The method can also comprise transferring, by the translocating the roller across the microfluidic card, an output of the first nanofluidic chip to a second nanofluidic chip comprised within the microfluidic card. An advantage of such a method can be the use of translocating a roller to both pressurize one or more fluidic reservoirs and transfer a sample fluid between nanofluidic chips.

In some examples, the pressurizing and the transferring can be performed in accordance with a time-sequence established by the translocating the roller across the microfluidic card. An advantage of such a method can be that execution of the method can be automated, wherein one or more parameters of execution can be pre-defined by the architecture of microfluidic card.

DETAILED DESCRIPTION

Figure 1:
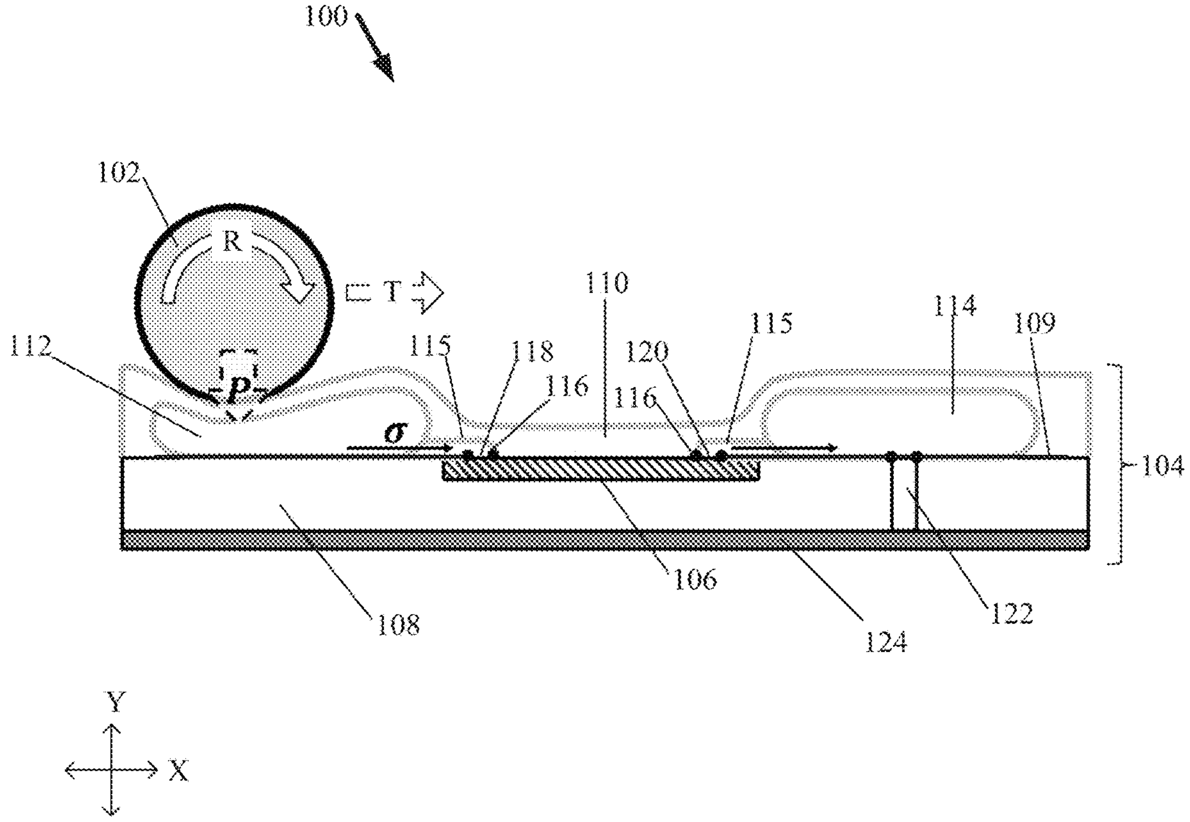
FIG. 1 illustrates a diagram of an example, non-limiting system that can utilize a roller to drive fluid flow through a nanofluidic chip embedding within a microfluidic card in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the above problems with conventional operation of one or more nanofluidic chips; the present disclosure can be implemented to produce a solution to one or more of these problems in the form of one or more apparatuses, systems, and/or methods that can enable automation of sequential operation of nanofluidic chips that require pressure driven flows. For example, one or more nanofluidic chips can be comprised within a microfluidic card, wherein fluid flow amongst the one or more nanofluidic chips can be driven by an external pressure generated by one or more rollers translocating across the microfluidic card. Linear progression of the microfluidic card through a roller mill comprising the one or more rollers can establish a time-sequence, in which each nanofluidic chip arranged along the length of the microfluidic card can be pressurized and/or processed in turn by the one or more rollers. The output of one nanofluidic chip can be driven up-stream of the one or more rollers, and then pressurized to drive the processing of the next, downstream nanofluidic chip. The one or more rollers can also act as one or more valves, sealing off back-flow at a pinch-point where the roller contacts the microfluidic card. Advantageously, different configurations of nanofluidic chips on the microfluidic card, as well as different sizes of microfluidic card, can be accommodated by the same roller mill. Further, linear translation of the microfluidic card through a roller mill can allow complex sequences of nanofluidic devices to be run in a single operation, without oversight or intervention.

Various embodiments described herein can comprise systems, apparatuses, and/or methods that can regard a microfluidic card that can embed one or more nanofluidic chips in a sequence along its length. For instance, the microfluidic card can be run by conveying the microfluidic card through a roller mill comprising one or more rollers, which can generate fluidic pressure by compressing and/or squeezing one or more fluidic reservoirs comprised within the microfluidic card. Nanofluidic chip located within the microfluidic card can be run in sequence, with translocation of the roller mill across the microfluidic card pressurizing the output of the previous nanofluidic chip and transmitting it to the next nanofluidic chip. One or more outputs of the processing driven by translocation of the roller can be stored on the microfluidic card and/or can be retrieved after the microfluidic card has been conveyed through one or more rollers of the roller mill. Additionally, one or more embodiments described herein can regard an apparatus to house operation of the microfluidic card and/or various inlet devices to facilitate the loading of fluids onto the microfluidic card.

FIG. 1 illustrates a diagram of an example, non-limiting system 100 that can comprise one or more rollers 102 and/or one or more microfluidic cards 104, wherein translocation of the one or more rollers 102 across the one or more microfluidic cards 104 can pressurize one or more fluid flows in accordance with one or more embodiments described herein. As shown in FIG. 1, the one or more microfluidic cards 104 can house one or more nanofluidic chips 106. The one or more nanofluidic chips 106 can include any device constructed in a thin film or sheet of material where one or more features (e.g., having one or more dimensions greater than or equal to 1 nm and/or less than or equal to 1000 nm) can be used to hold and/or convey fluids (e.g., aqueous, gaseous, and/or otherwise) for the purposes of analyzing, manipulating, detecting, conveying, transforming, or any other desired operation. Example materials that can comprise the one or more nanofluidic chips 106 can include, but are not limited to: silicon, metal, plastic, composites, ceramic stacks, biological tissues and/or materials, a combination thereof, and/or the like. Example features that can be comprised within the one or more nanofluidic chips 106 can include, but are not limited to: fluidic channels, capillaries, tubes, nanoDLD arrays, mixing elements, junctions, injection ports, logic elements, a combination thereof, and/or the like. Operations of the one or more nanofluidic chips 106 can include, but are not limited to: protein detection, particle size separation, polymerase chain reaction ("PCR") amplification, antibody capture, spectroscopy, spatial sequestering and/or order of biomolecules, macromolecular sequencing and/or mapping, a combination thereof, and/or the like. One of ordinary skill in the art will recognize that the size and/or shape of the one or more nanofluidic chips 106 can vary widely. However, an example size of the one or more nanofluidic chips 106 can be below 20 centimeters (cm) by 20 cm, such as nanofluidic chips 106 having 1 to 2 cm per edge, but smaller nanofluidic chips 106 (e.g., down to microscopic dimensions) are also envisaged. Thus, the one or more nanofluidic chips 106 can be small, thin pieces of material that can be embedded into the one or more microfluidic cards 104 and/or linked together with one or more other nanofluidic chips 106 to allow fluid communication between them.

Additionally, the one or more microfluidic cards 104 can comprise a substrate 108 having one or more pockets to seat each nanofluidic chip 106. Example materials that can comprise the substrate 108 can include, but are not limited to: plastics, metals, composites, a combination thereof, and/or the like. In one or more embodiments, the substrate 108 can comprise molded polycarbonates and/or cyclic-olefin co-polymers. An elastic membrane 110 can be disposed over the one or more nanofluidic chips 106 and/or a top surface 109 of the substrate 108. Example materials that can comprise the elastic membrane 110 can include, but are not limited to: plastics, elastomers, composites, textiles, treated paper, a combination thereof, and/or the like. In various embodiments, the elastic membrane 110 can comprise a molded silicone film. In one or more embodiments, the elastic membrane 110 can be selectively bonded to the substrate 108 (e.g. via thermal bonding, laser welding, adhesion promoters, a combination thereof, and/or the like) to pattern regions that are bonded to the substrate 108 and/or regions which are unbonded to the substrate 108. The pattern of bonded and/or unbonded regions of the clastic membrane 110 can form a series of channels and/or pockets which can act as fluidic conduits. Fluid introduced into these conduits can held between the elastic membrane 110 and the substrate 108.

As shown in FIG. 1, example fluidic conduits defined by the elastic membrane 110 can include one or more input reservoirs 112 and/or one or more output reservoirs 114. Additionally, the one or more input reservoirs 112 and/or the one or more output reservoirs 114 can be in fluid communication with the one or more nanofluidic chips 106 via a series of fluidic channels 115 defined by the elastic membrane 110. For example, the one or more input reservoirs 112 and/or one or more output reservoirs 114 can be defined by an unbonded region in the elastic membrane 110 and/or can store a substantial amount of fluid. The elastic nature of the clastic membrane 110 causes the one or more input reservoirs 112 and/or one or more output reservoirs 114 to swell and/or protrude up from the substrate 108.

In various embodiments, the one or more input reservoirs 112 can act as pressure chambers, which can be actuated by the one or more rollers 102 (e.g., as shown in FIG. 1). Positioning the one or more rollers 102 over the one or more input reservoirs 112 can exert a mechanical pressure down onto the one or more input reservoirs 112, as represented by the "P" arrow shown in FIG. 1. The pressure acting on the one or more input reservoirs 112 by the one or more rollers 102 can cause the one or more input reservoirs 112 to compress and/or expel the fluid stored within. This pressure can drive the fluid to flow through the one or more fluidic channels 115. One or more gaskets 116 (e.g., such as O-rings and/or thin-films of elastomer) can be positioned onto the one or more nanofluidic chips 106 prior to disposing the elastic membrane 110. For example, the one or more gaskets 116 can be positioned at one or more inlets 118 and/or one or more outlets 120 of the one or more nanofluidic chips 106. The gaskets 116 can serve as intermediates between the one or more fluidic channels 115 and/or the one or more nanofluidic chips 106 and/or can provide a leak-proof seal. For elastomeric gaskets 116, the compression induced by the bonding of the elastic membrane 110 to the substrate 108 can induce the volumetric changes needed to seal the gasket interface.

In one or more embodiments, the one or more rollers 102 can exert pressure against the one or more input reservoirs 112, which can be loaded with a desired sample fluid to be processed by the one or more nanofluidic chips 106. The sample fluid can be pressurized and/or driven at a mass flow rate (e.g., represented by "o") into the one or more nanofluidic chips 106 via the one or more fluidic channels 115 and/or the one or more inlets 118 of the one or more nanofluidic chips 106. The pressurized sample fluid can be processed in the one or more nanofluidic chip 106 (e.g., either through the imparted energy of the flowing liquid, or through internal/external stimuli) and can be emitted through the one or more outlets into conduits (e.g., one or more additional input reservoirs 112 and/or one or more output reservoirs 114) in the elastic membrane 110. For example, one or more processed samples from the sample fluid can be emitted by the one or more nanofluidic chips 106 and stored within one or more output reservoirs 114. Further, the one or more processed samples stored in the one or more output reservoirs 114 be extracted from the microfluidic card 104 by puncturing the elastic membrane 110 (e.g., puncturing the one or more output reservoirs 114) or by a port 122 on the backside of the microfluidic card 104 formed by a hole penetrating through the substrate 108. The port 122 can be protected from contamination or drying out of the one or more processed samples by a back film 124 applied to the backside of the substrate 108 (e.g., as shown in FIG. 1). In addition, a middle film can be disposed over the one or more nanofluidic chips 106, one or more gaskets 116, and/or top surface 109 of the substrate 108 prior to bonding the elastic membrane 110. The middle film can act as an additional barrier against evaporation and/or contamination and/or can be punctured and/or removed by an operator either through the topside or backside of the microfluidic card 104.

The induced pressure (e.g., represented by the "P" arrow shown in FIG. 1) can be determined by a contact area between the one or more rollers 102 and/or the elastic membrane 110 (e.g., the one or more input reservoirs 112), as well as the applied torque on the one or more rollers 102. The torque loading can be set by a type of motor and/or gear configuration attached to the one or more rollers 102. An example pressure (e.g., represented by the "P" arrow shown in FIG. 1) that can be generated by the one or more rollers 102 against the elastic membrane 110 can be greater than or equal to 1 bar and less than or equal to 20 bars. The pressure (e.g., represented by the "P" arrow shown in FIG. 1) can be adjusted by adjusting the height (e.g., along the "Y" axis shown in FIG. 1) of the one or more rollers 102, the speed at which the one or more rollers 102 rotate (e.g., in a rotation direction delineated by the "R" arrow shown in FIG. 1), and/or the contact area and/or shape of the elastic membrane 110 (e.g., the one or more input reservoirs 112). The elastic membrane 110 can have a plastic yield and/or rupture strength greater than the expected maximum applied pressure. Also, the bonding strength of the elastic membrane 110 to the substrate 108 can be sufficiently higher than the expected maximum pressure to prevent delamination and then leaking of fluid. While FIG. 1 depicts a microfluidic card 104 comprising fluid conduits located only at a top surface 109 of the substrate 108, the architecture of the one or more microfluidic cards 104 is not so limited. For example, one or more clastic membranes 110 can also be disposed on a backside of the microfluidic card 104 (e.g., onto the back film 124) thereby enabling the formation of one or more fluid conduits (e.g., fluid channels 115, input reservoirs 112, and/or output reservoirs 114) to the located on the backside of the microfluidic card 104 opposite the top surface 109.

In addition, the one or more rollers 102 can translocate across the one or more microfluidic cards 104, wherein the direction of translocation can be delineated in FIG. 1 by the "T" arrow. The one or more rollers 102 and/or the one or more microfluidic cards 104 can be conveyed along the "X" axis shown in FIG. 1 to facilitate translocation of the one or more rollers 102. As the one or more rollers 102 translocate across the one or more microfluidic cards 104, the pressure exerted by the one or more rollers 102 can be applied to different regions of the clastic membrane 110.

Figure 2:
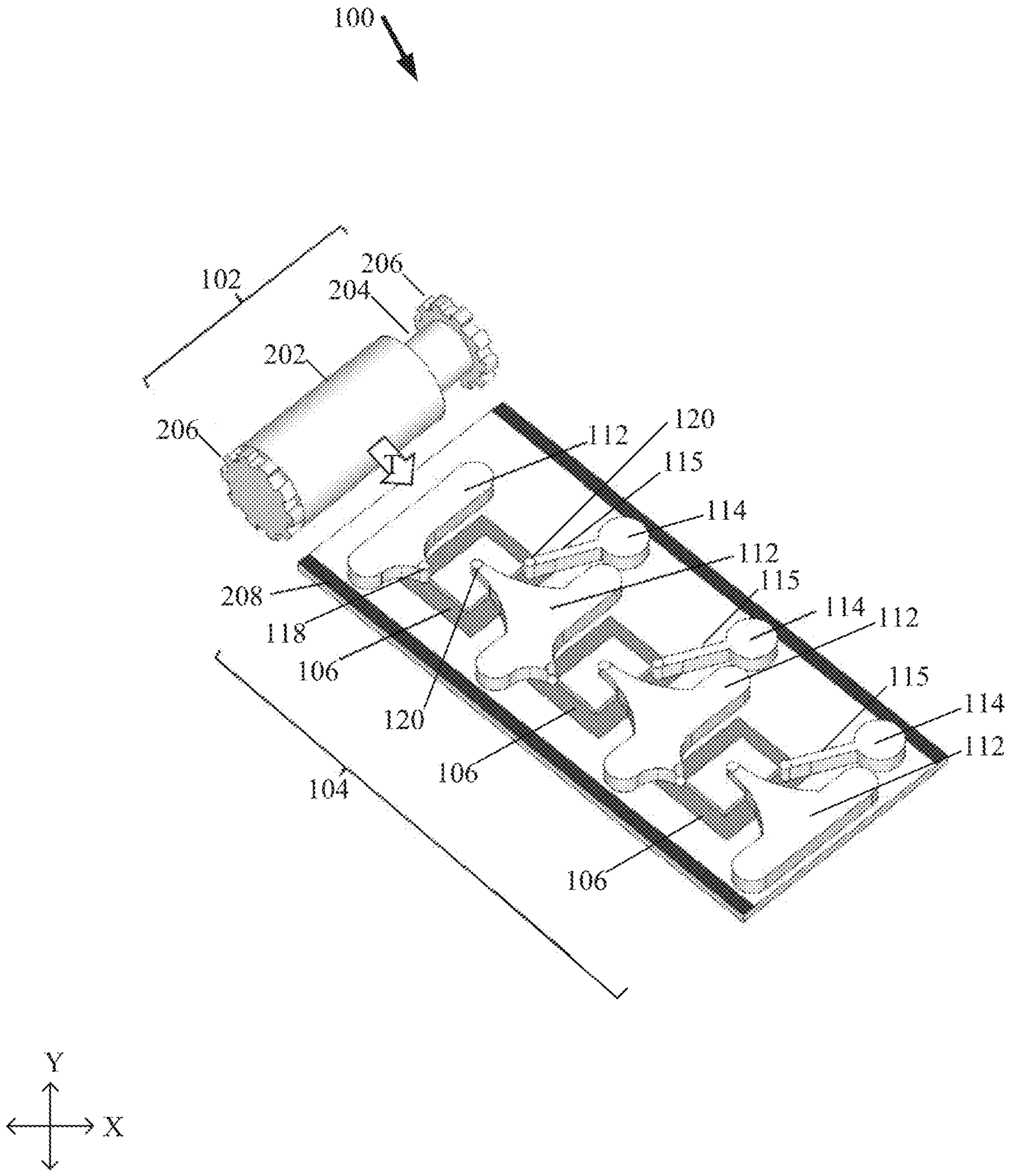
FIG. 2 illustrates a diagram of an example, non-limiting system that can utilize translocation of a roller of a microfluidic card to sequentially drive fluid flow amongst a plurality of nanofluidic chips in accordance with one or more embodiments described herein.

FIG. 2 illustrates a diagram of the example, non-limiting system 100 comprising a microfluidic card 104 housing a plurality of nanofluidic chips 106 in accordance with one or more embodiments described herein. Repetitive description of like elements employed in other embodiments described herein is omitted for sake of brevity. As shown in FIG. 2, the one or more microfluidic cards 104 can have a sufficient length such that a plurality of nanofluidic chips 106 can be embedded within the substrate 108.

Additionally, as show in FIG. 2, the fluid conduits defined by the elastic membrane 110 (e.g., the one or more fluid channels 115 and/or the one or more input reservoirs 112) can be patterned in the top surface 109 of the substrate 108 to connect one or more outlets 120 of a first nanofluidic chip 106 to one or more inlets 118 of a second nanofluidic chip 106, and so forth (e.g., connecting the one or more outlets 120 of the second nanofluidic chip 106 to the one or more inlets 118 of a third nanofluidic chip 106). An input reservoir 112 positioned before the first nanofluidic chip 106 along the translocation path (e.g., represented by the "T" arrow) of the one or more rollers 102 is where one or more sample fluids can be loaded onto the one or more microfluidic cards 104 prior to operation of the system 100, and from which one or more fluidic channels 115 can direct the sample fluid into the one or more inlets 118 of the first nanofluidic chip 106.

FIG. 2 depicts an exemplary microfluidic card 104 with three consecutive nanofluidic chips 106, each with one inlet 118 and 2 outlets 120. As shown in FIG. 2 one of the outlets 120 of each nanofluidic chip 106 can be in fluid communication with an output reservoir 114. The other outlet 120 can be in fluid communication with a second input reservoir 112, which can serve as a transfer reservoir between the first and second nanofluidic chips 106. For example, the second input reservoir 112 can be in fluid communication with to the inlet 118 of the next, subsequent nanofluidic chip 106. Thus, outputs of the one or more nanofluidic chips 106 can flow into respective output reservoirs 114 and/or flow to one or more additional nanofluidic chips 106 for further processing.

Also shown in FIG. 2, the one or more rollers 102 can include one or more contact regions 202 and/or one or more non-contact regions 204. The one or more contact regions 202 can be regions along the one or more rollers 102 that can exert pressure against the clastic membrane 110 as the one or more rollers 102 translocate across the one or more microfluidic cards 104 (e.g., in a direction delineated by the "T" arrow shown in FIG. 2). In contrast, the one or more non-contact regions 204 can be regions along the one or more rollers 102 that do not exert pressure against the elastic membrane 110 as the one or more rollers 102 translocate across the one or more microfluidic cards 104 (e.g., in a direction delineated by the "T" arrow shown in FIG. 2). For example, the one or more rollers' circumference in the one or more non-contact regions 204 can be smaller than the circumference in the one or more contact regions 202 such that a clearance is maintained between the non-contact regions 204 of the one or more rollers 102 and the elastic membrane 110. While FIG. 2 exemplifies an arrangement of the one or more contact regions 202 and/or non-contact regions 204; different rollers 102 with different patterns of contact regions 202 and/or non-contact regions 204 are also envisaged. Example materials that can comprise the one or more rollers 102 in the various embodiments described herein can include, but are not limited to: high grade machining steel and/or aluminum, similar metals and/or alloys thereof, a combination thereof, and/or the like.

Additionally, the one or more rollers 102 can include one or more gears 206 (e.g., pinions) to allow registry with a rack 208 (e.g., a track) located on the one or more microfluidic cards 104. The one or more gears 206 can allow the one or more rollers 102 to interlock and/or align the one or more microfluidic cards 104 orthogonal to the one or more rollers 102, to prevent errors from misalignment and/or slip. The microfluidic card 104 width can be set by the width of the one or more rollers 102.

The configuration of the one or more fluid conduits defined by the elastic membrane 110 (e.g., the one or more input reservoirs 112, the one or more output reservoirs 114, and/or the one or more fluid channels 115) can be based on the function of the one or more nanofluidic chips 106 and/or by the placement of contact regions 202 and/or non-contact regions 204 on the one or more rollers 102. For example, in FIG. 2 the one or more output reservoirs 114 can aligned with the non-contact region 204 on the one or more rollers 102, such that the one or more output reservoirs 114 can avoid pressurization when the one or more rollers 102 translocate across the one or more microfluidic cards 104. Additionally, in one or more embodiments, one or more of the fluid channels 115 can be positioned over the one or more nanofluidic chips 106, as shown in FIG. 2. Fluid channels 115 positioned over the one or more nanofluidic chips 106 can be utilized to capture a large amount of fluid over a set area on respective nanofluidic chip 106, which can then be transferred to a downstream fluid conduit (e.g., an input reservoir 112).

Figure 3:
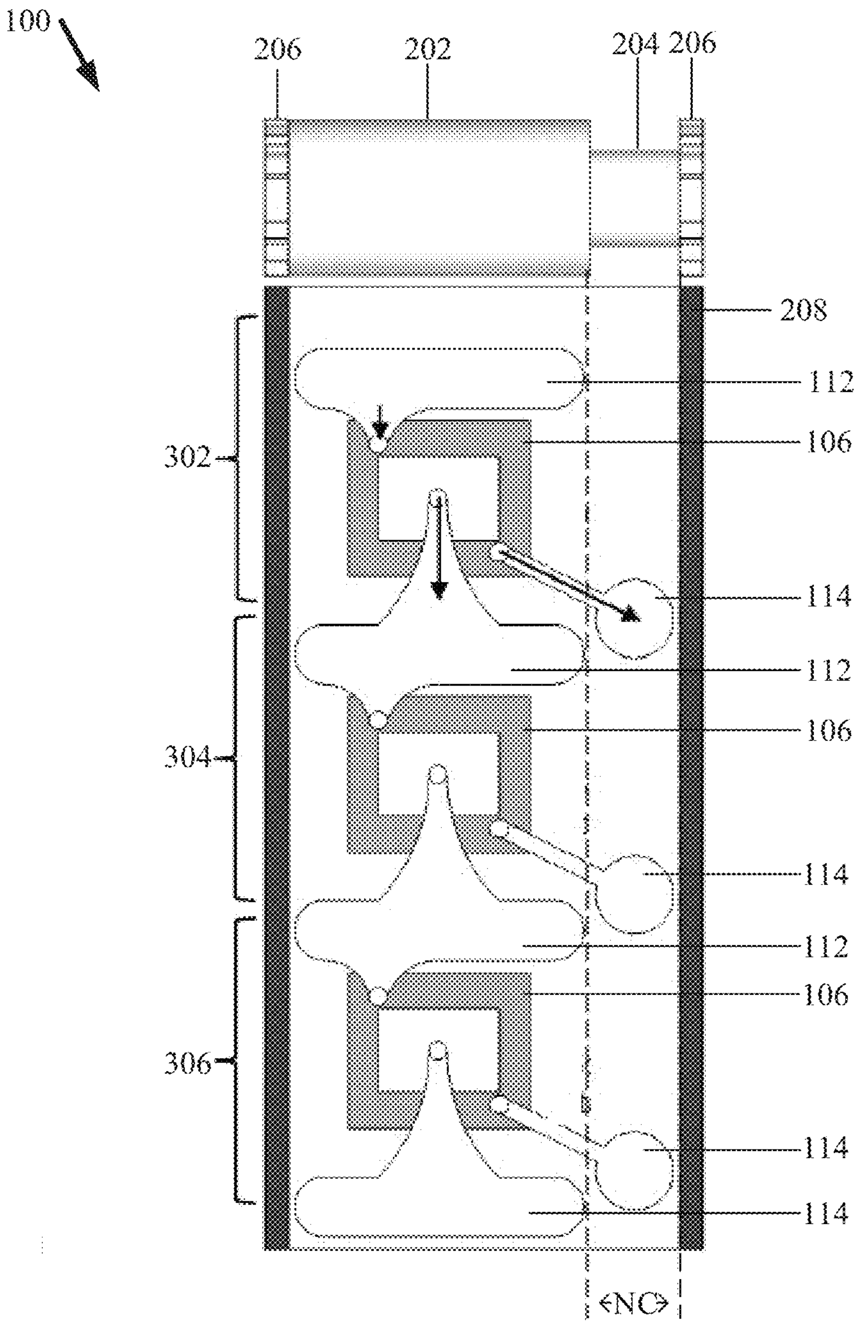
FIG. 3 illustrates a diagram of an example, non-limiting system that can utilize translocation of a roller of a microfluidic card to sequentially drive fluid flow amongst a plurality of nanofluidic chips in accordance with one or more embodiments described herein.

FIG. 3 illustrates a diagram of the example, non-limiting top-down view of the system 100 comprising the microfluidic card 104 housing a plurality of nanofluidic chips 106 in accordance with one or more embodiments described herein. Repetitive description of like elements employed in other embodiments described herein is omitted for sake of brevity. FIG. 3 can exemplify a fluid flow (e.g., delineated by the arrows in FIG. 3) of a sample fluid through one or more stages of processing facilitated by the architecture of the one or more microfluidic cards 104.

For descriptive clarity, the one or more microfluidic cards 104 can be considered as comprising one or more stages, wherein each stage can be associated with a respective processing and/or analysis of a sample fluid. For example, as shown in FIG. 3, the exemplary microfluidic card 104 shown in FIG. 3 can be portioned into three stages with two input reservoirs 112 acting as transfer reservoirs supplying fluid from a first stage 302 to a second stage 304 and/or a third stage 306. Further, three output reservoirs 114 can collect the sorted fractions from each of the stages respectively. Additionally, a fourth output reservoir 114 can collect the final unsorted particles from third stage 306. Further, FIG. 3 can depict an alignment of the one or more non-contact regions 204 with the one or more output reservoirs 114. For example, the “NC” arrow can delineate an area on the microfluidic card 104 that can align with the non-contact region 204 of the one or more rollers 102 and thereby can avoid pressurization.

Figure 4:
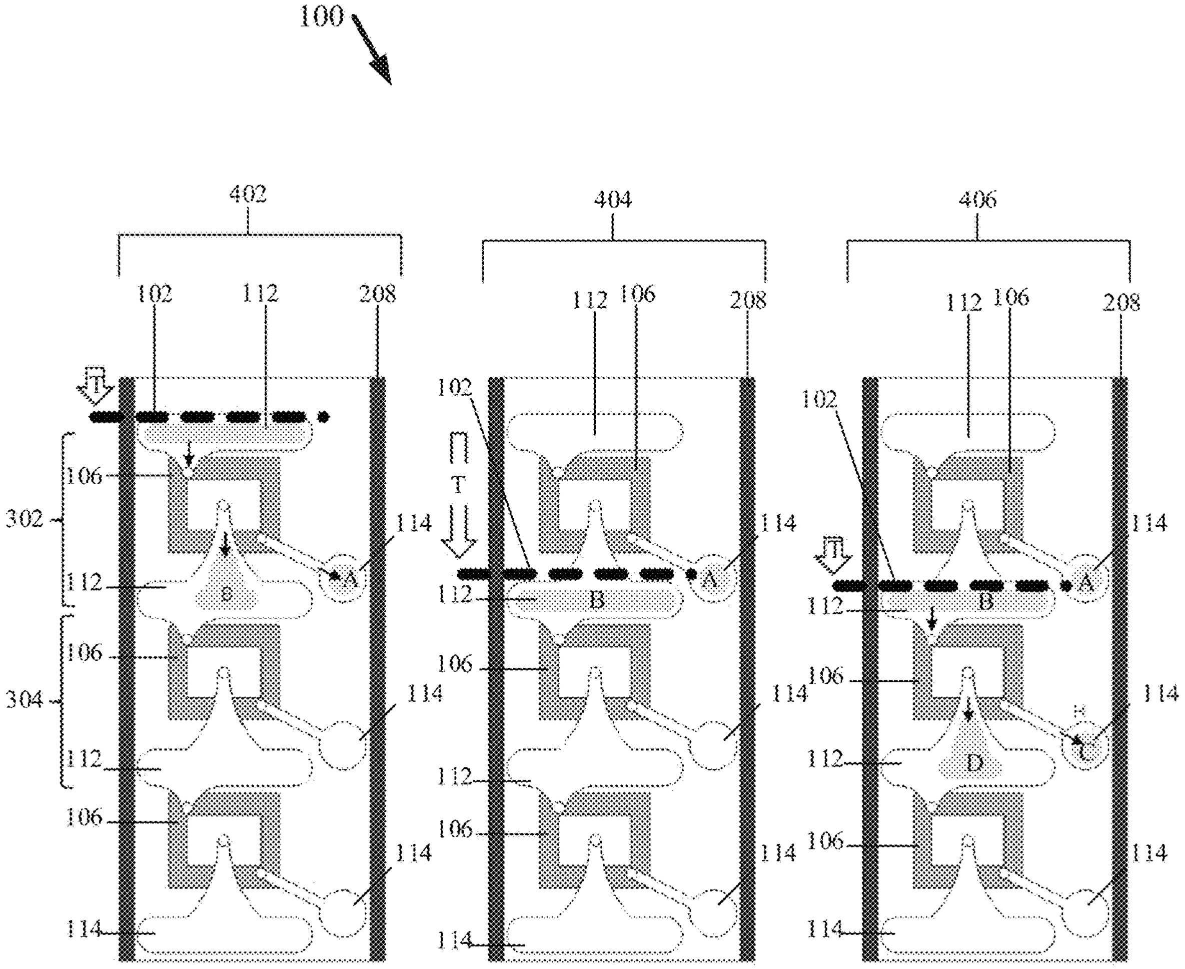
FIG. 4 illustrates a diagram of an example, non-limiting system that can utilize translocation of a roller of a microfluidic chip to sequentially drive fluid flow amongst a plurality of nanofluidic chips in accordance with one or more embodiments described herein.

FIG. 4 illustrate a diagram of example, non-limiting scenes depicting the system 100 processing various stages of a microfluidic card 104 comprising a plurality of nanofluidic chips 106 in accordance with one or more embodiments described herein. Repetitive description of like elements employed in other embodiments described herein is omitted for sake of brevity.

To exemplify a fluid flow (e.g., delineated by the arrows in FIG. 4) through the one or more microfluidic cards 104, nanofluidic chips 106 comprising one or more nanoDLD devices are described herein with regards to FIG. 4. For example, the one or more nanofluidic chips 106 can process a sample fluid consisting of multiple-sized particles into different size-based fractions. For instance, for each nanofluidic chip 106, particles of a critical size can be sorted into a respective output reservoir 114, while all particles smaller than the critical size can flow into the unsorted sample in the transfer blister.

In one or more embodiments, the microfluidic card 104 can be processed from the first stage 302 to the third stage 306. For example, one or more features comprised within the second stage 304 can be downstream of one or more features comprised within the first stage 302. A first scene 402 of FIG. 4, can depict processing a sample fluid at the first stage 302 of the microfluidic card 104. As shown in the first scene 402, the one or more rollers 102 can advance towards the input reservoir 112 of the first stage 302 (e.g., wherein translocation of the one or more rollers 102 can be represented by the “T” arrow in FIG. 4). The microfluidic card 104 can contact the one or more rollers 102 such that the input reservoir 112 of the first stage 302 can contact the one or more rollers 102 first, and thus pressurizes first. Pressurized sample fluid contained within the input reservoir 112 of the first stage 302 can flow into the nanofluidic chip 106 of the first stage 302 and can be processed. The outputs of the nanofluidic chip 106 of the first stage 302 can flow into one or more downstream fluid channels 115. For example, one or more first outputs (e.g., delineated by “A” in FIG. 4) of the nanofluidic chip 106 of the first stage 302 can flow into a respective output reservoir 114 of the first stage 302, or one or more second outputs (e.g., delineated by “B” in FIG. 4) can flow to the input reservoir 112 of the second stage 304.

Next, a second scene 404 can depict advancement of the one or more rollers 102 to facilitate further processing of the sample fluid. For example, the one or more rollers 102 can advance over the nanofluidic chip 106 of the first stage 302 and the one or more fluid channels 115 of the first stage 302 until it contacts the input reservoir 112 of the second stage 304 (e.g., wherein translocation of the one or more rollers 102 can be represented by the “T” arrow in FIG. 4). In one or more embodiments, the advancement of the one or more rollers 102 can also squeeze any remaining sample in the fluid channel 115, that connects to the non-contacted output reservoir 114. Additionally, in various embodiments the translocation of the one or more rollers 102 across the microfluidic card 104 can be faster in the second scene 404 than the first scene 402 (e.g., as depicted by a longer “T” arrow in the second scene 404). For example, the one or more rollers 102 can pass over the one or more input reservoirs 112 more slowly than the one or more nanofluidic chips 106.

Next, a third scene 406 of FIG. 4 can depict processing the sample fluid at the second stage 304 of the microfluidic card 104. Contact between the one or more rollers 102 and the input reservoir 112 of the second stage 304 can pressurize the sample fluid (e.g., the one or more second outputs “B” from the first stage 302) once again and drive the sample fluid into the nanofluidic chip 106 of the second stage 304. As shown in the third scene 406, the processing in the second stage 304 can result in one or more outputs from the nanofluidic chip 106 of the second stage 304 flowing into one or more downstream fluid channels 115. For example, one or more first outputs (e.g., delineated by “C” in FIG. 4) of the nanofluidic chip 106 of the second stage 304 can flow into a respective output reservoir 114 of the second stage 304, or one or more second outputs (e.g., delineated by “D” in FIG. 4) of the nanofluidic chip 106 of the second stage 304 can flow to the input reservoir 112 of the third stage 306.

Once processing at the second stage 304 is complete, the one or more rollers 102 can advance until contact is made the next input reservoir 112 (e.g., acting as a transfer reservoir) and/or can begin pressurizing the sample fluid (e.g., the one or more second outputs "D" from the second nanofluidic chip 106) at the third stage 306. The one or more rollers 102 can continue translocating across the microfluidic card 104 in accordance with the various features described herein with regards to FIG. 4 until the one or more rollers 102 reach the end of the microfluidic card 104 or a pre-set position before the last output reservoir 114.

Translocation of the one or more rollers 102 across the one or more microfluidic cards 104 can be controlled through a variety of means. The speed, dwell time, pressure, and/or location of the one or more rollers 102 can be guided in several ways, including, but not limited to: using a fixed linear speed, and/or executing one or more computer readable program on one or more computer systems operably coupled to the one or more rollers 102. In one or more embodiments, a set of contact pins (e.g., brush and/or pin contacts) positioned downstream of the one or more rollers 102 can comprise a strip of area on the one or more microfluidic cards 104. Further, contact pads (e.g., energized to a battery) can be laid along the strip of area, wherein the contact pads can be engaged upon contact with the one or more contact pins. Engagement of the one or more contact pads can correlate the execution of one or more computer programs, which can control various parameters of the one or more rollers 102 (e.g., such as rotation speed, pressure applied to the elastic membrane 110, speed of translocation, a combination thereof, and/or the like). Additionally, different arrangements of the contact pads can execute different computer programs (e.g. causing the one or more rollers 102 to dwell for fixed time, operate at an increment speed, and/or operate in accordance to a pre-set protocol).

The use of the one or more rollers 102 to linearly process one or more nanofluidic chips 106 in sequence (e.g., as shown in FIGS. 2-4) can exhibit several advantageous effects. For example, the one or more rollers 102 can be set to be in full contact with the one or more microfluidic cards 104, and thus can pinch and/or seals off any conduits under the subject area. Thereby, the pressure generated by the one or more rollers 102 can act as a valve against backflow (e.g., when the one or more rollers 102 are squeezing the one or more input reservoirs 112, the one or more rollers 102 can prevent fluid from flowing upstream into the previous nanofluidic chip 106). Additionally, the action of the one or more rollers 102 can push any fluid in a conduit defined by the elastic membrane 110 until the fluid is compressed and concentrated; thus, the action of the one or more rollers 102 can concentrate any fluid in its path until the fluid is pressurized in fluid conduit or a nanofluidic chip 106. Therefore, the action of the one or more rollers 102 can be advantageous for squeezing small volumes of sample fluid into a collection point, such as into an output reservoir 114 aligned with a non-contact region 204. Moreover, the ability of the one or more rollers 102 to act as a valve can mean that fluid can be processed in one direction, and the layout of fluid channels 115 can be set such that the passing of the one or more rollers 102 can gate the transfer of fluid across the microfluidic card 104 or into the nanofluidic chips 106. Furthermore, in one or more embodiments, one or more outputs of the one or more nanofluidic chips 106 can be transferred (e.g., by one or more ports 122) to the backside of the microfluidic card 104, and thus away from the one or more roller 102, rather than being stored in one or more output reservoirs 114 stored on the top surface 109 of the substrate 108.

Figure 5:
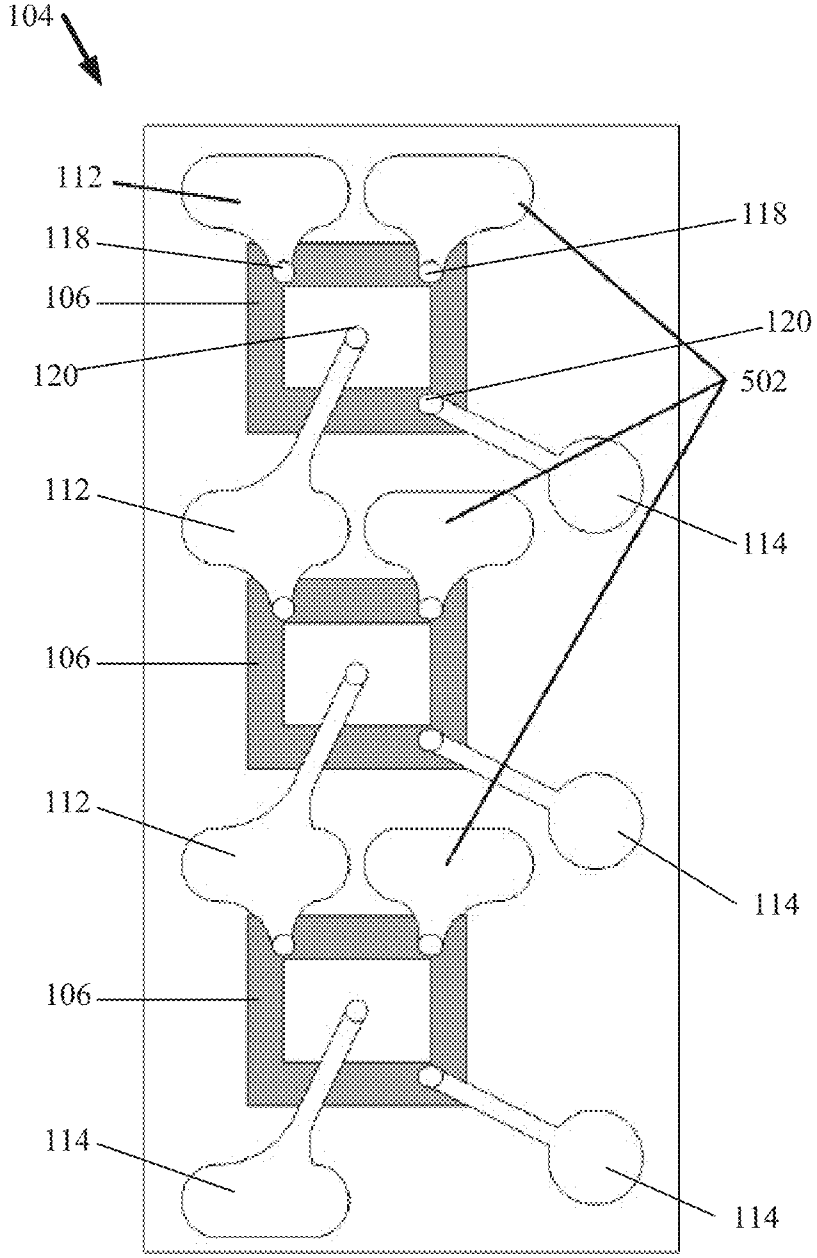
FIG. 5 illustrates a diagram of an example, non-limiting system that can utilize translocation of a roller of a microfluidic card to sequentially drive fluid flow from a plurality of input sources and/or amongst a plurality of nanofluidic chips in accordance with one or more embodiments described herein.

FIG. 5 illustrates a diagram of an example, non-limiting microfluidic card 104 comprising one or more supplemental input reservoirs 502 in fluid communication with the one or more nanofluidic chips 106 in accordance with one or more embodiments described herein. Repetitive description of like elements employed in other embodiments described herein is omitted for sake of brevity. As shown in FIG. 5, the one or more nanofluidic chips 106 can have one or more additional input sources to supplement sample fluid contained within and/or transferred by the one or more input reservoirs 112. For example, the one or more nanofluidic chips 106 can be in fluid communication with one or more supplemental input reservoirs 502, wherein the one or more supplemental input reservoirs 502 can have the same, and/or similar features, as the one or more input reservoirs 112. For instance, the one or more supplemental input reservoirs 502 can also be formed by bonded and/or non-bonded portions of the elastic membrane 110, and/or can thereby be defined by the elastic membrane 110.

FIG. 5 can depict two inputs, two outputs nanofluidic chips 106; wherein the output of a first nanofluidic chip 106 can be used as a first input for a second nanofluidic chip 106. This card runs three of these chips in series. Further, a second input of the first nanofluidic chip 106 and/or the second nanofluidic chip 106 can be supplied from respective sealed supplemental input reservoirs 502. For example, each nanofluidic chip 106 depicted in FIG. 5 can receive a sample fluid from an upstream input reservoir 112 and/or a second fluid (e.g., an exchange buffer fluid) from an upstream supplemental input reservoir 502 (e.g., also defined by the elastic membrane 110). Thus, multiple input sources can supply various types of fluids to a nanofluidic chip 106 at each stage of the microfluidic card 104.

While FIG. 5 depicts nanofluidic chips 106 in fluid communication with a single supplemental input reservoir 502 (e.g., two input nanofluidic chips 106); the architecture of the one or more microfluidic cards 104 is not so limited. For example, additional supplemental input reservoirs 502 can be included at one or more stages of the one or more microfluidic cards 104 to facilitate nanofluidic chips 106 with greater input functionality (e.g., three input nanofluidic chips 106).

Figure 6:
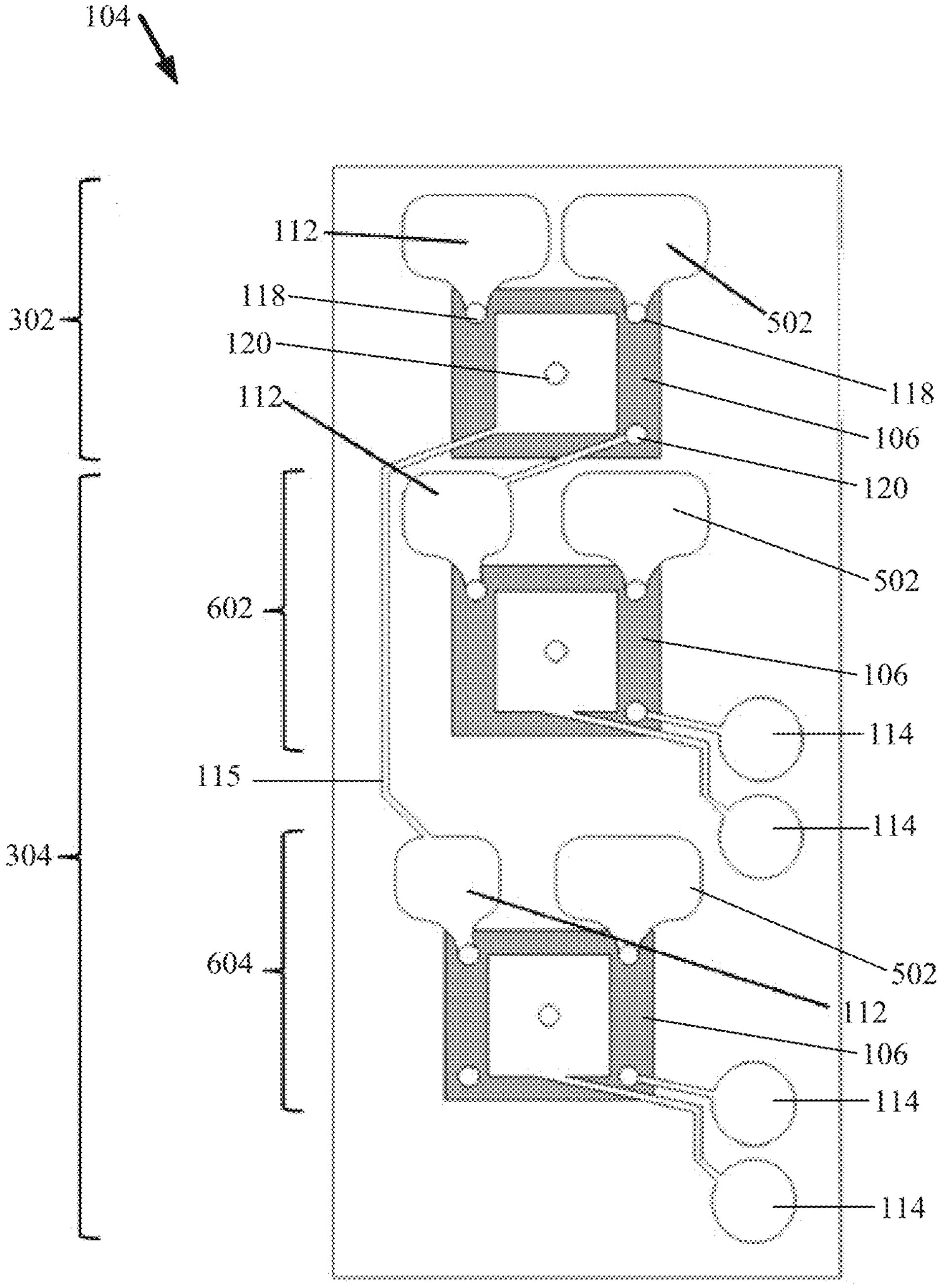
FIG. 6 illustrates a diagram of an example, non-limiting system that can utilize translocation of a roller of a microfluidic card to sequentially drive fluid flow from a plurality of input sources and/or amongst a plurality of nanofluidic chips in accordance with one or more embodiments described herein.

FIG. 6 illustrates a diagram of an example, non-limiting microfluidic card 104, wherein two or more outputs of a nanofluidic chip 106 can be further processed downstream by one or more other nanofluidic chips 106 in accordance with one or more embodiments described herein. Repetitive description of like elements employed in other embodiments described herein is omitted for sake of brevity. Whereas FIGS. 1-5 depict microfluidic cards 104 with two output nanofluidic chips 106, wherein a first output of the nanofluidic chips 106 is stored in an output reservoir 114 and/or a second output of the nanofluidic chips 106 is transferred downstream to serve as an input for another nanofluidic chip 106; FIG. 6 exemplifies that the architecture of the one or more microfluidic cards 104 is not so limited. For example, two or more outputs from a nanofluidic chip 106 can serve as inputs for two or more other nanofluidic chips 106 positioned downstream, wherein a first output from a first nanofluidic chip 106 can serve as an input for a downstream second nanofluidic chip 106 and/or a second output from the first nanofluidic chip 106 can serve as an input for a downstream third nanofluidic chip 106 (e.g., as shown in FIG. 6).

FIG. 6 can depict a two input, two output nanofluidic chip 106 in which both outputs are processed again by respective downstream nanofluidic chips 106. For instance, the outputs can be processed sequentially, by two separate nanofluidic chips 106 downstream. One of ordinary skill in the art will appreciated that various combinations of fluid conduits (e.g., fluid channels 115, input reservoirs 112, output reservoirs 114, and/or supplemental input reservoirs 502) can enable multiple sequences of processing. During the first stage 302 of the microfluidic card 104 depicted in FIG. 6, a sample fluid and/or one or more additional fluids (e.g., exchange buffer fluids) can be initially processed by a first nanofluidic chip 106. Subsequently, both outputs of the first nanofluidic chip 106 can be further processed during the second stage 304 of the microfluidic card 104. As shown in FIG. 6, the second stage 304 of the microfluidic card 104 can comprise a first sub-stage 602 and/or a second sub-stage 604. As the one or more rollers 102 translocate across the microfluidic card 104, the one or more rollers 102 can initiate the first sub-stage 602 followed by the second sub-stage 604.

At the first sub-stage 602, a first output of the first nanofluidic chip 106 of the first stage 302 can be processed (e.g., received as an input) by a second nanofluidic chip 106 located in the second stage 304. Further, the second nanofluidic chip 106 can receive one or more second inputs (e.g., one or more second fluids, such as an exchange buffer fluid) from a supplemental input reservoir 502. As shown in FIG. 6, the second nanofluidic chip 106 in the second stage 304 can produce two outputs, both of which can be collected by respective outlets 120 and/or stored in respective output reservoirs 114.

At the second sub-stage 604, a second output of the first nanofluidic chip 106 of the first stage 302 can be processed (e.g., received as an input) by a third nanofluidic chip 106 located in the second stage 304. Further, the third nanofluidic chip 106 can receive one or more second inputs (e.g., one or more second fluids, such as an exchange buffer fluid) from a supplemental input reservoir 502. As shown in FIG. 6, the third nanofluidic chip 106 in the second stage 304 can produce two outputs, both of which can be collected by respective outlets 120 and/or stored in respective output reservoirs 114.

In addition, while the depicted one or more microfluidic cards 104 show nanofluidic chips 106 arrangements that allow only a single chip to be processed at once, the architecture of the one or more microfluidic cards 104 is not so limited. For example, depending on the size of the microfluidic card 104 and/or the one or more nanofluidic chips 106, in various embodiments multiple nanofluidic chips 106 can be processed in parallel by being spaced across the width of the microfluidic card 104 in addition to, or instead of, the length of the microfluidic card 104.

Figure 7:
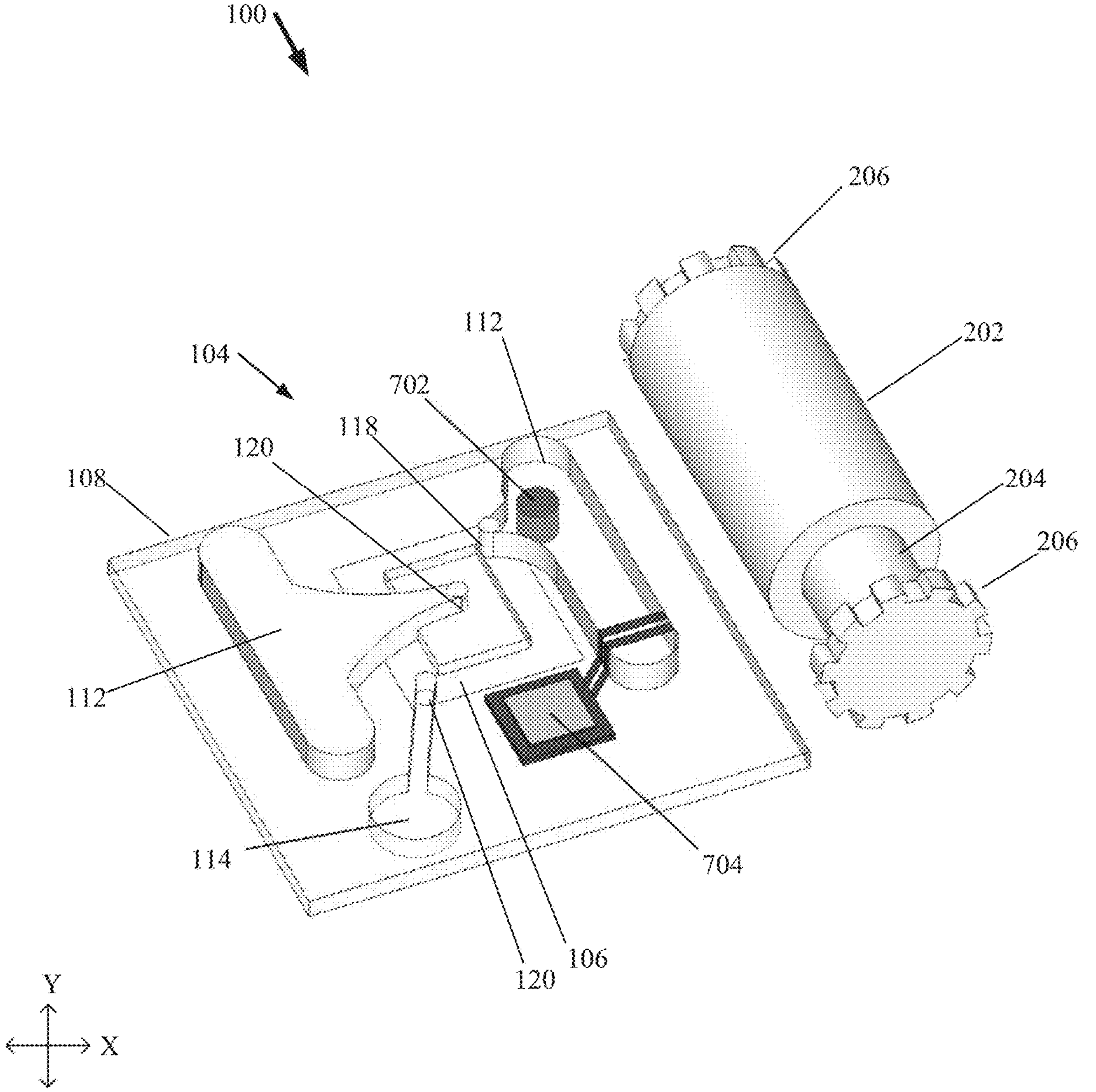
FIG. 7 illustrates a diagram of an example, non-limiting system that can utilize a roller to drive fluid flow through a nanofluidic chip embedding within a microfluidic card based on a pressure feedback device in accordance with one or more embodiments described herein.

FIG. 7 illustrates a diagram of the example, non-limiting system 100 wherein the one or more microfluidic cards 104 can comprise one or more pressure sensing mechanisms in accordance with one or more embodiments described herein. Repetitive description of like elements employed in other embodiments described herein is omitted for sake of brevity. As shown in FIG. 7 one or more first pressure sensors 702 can be positioned within one or more of the input reservoirs 112 and/or one or more second pressure sensors 704 can be positioned on the clastic membrane 110.

In one or more embodiments, the first pressure sensor 702 and/or the second pressure sensor 704 can be operably coupled (e.g., in electrical communication) with one or more processors that can facilitate operation of the one or more rollers 102. The first pressure sensor 702 can determine a pressure within the input reservoir 112 while force is exerted on the input reservoir 112 by the one or more rollers 102. Additionally, the one or more second pressure sensors 704 can determine a pressure on the elastic membrane 110 as the one or more rollers 102 advance to the next input reservoir 112 (e.g., transition to the next stage of the microfluidic card 104). Further, in one or more embodiments the one or more second pressure sensors 704 can extend across an outer surface of the one or more input reservoirs 112 to determine how pressure is being distributed through the input reservoirs 112 by the one or more rollers 102. In various embodiments, the advancement speed, the rotational speed, the torque, and/or the positioned (e.g., proximity to the elastic membrane 110) can be adjusted based on the pressure determined by the first pressure sensor 702 and/or the second pressure sensor 704. Example materials that can comprise the first pressure sensor 702 and/or the second pressure sensor 704 can include, but are not limited to: piezoelectric materials, oxides, ceramics, organic polymers, micromachined silicon, patterned metal, a combination thereof, and/or the like.

Figure 8A:
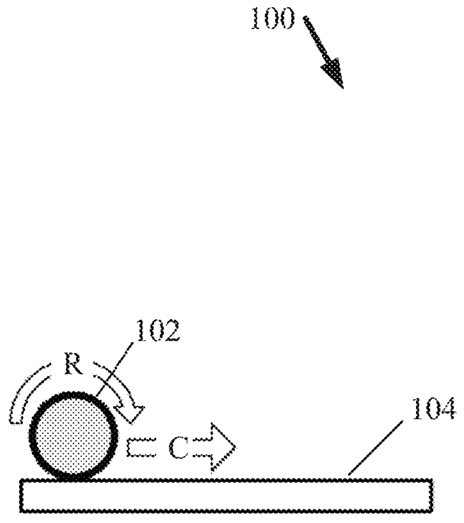
FIG. 8A illustrates a diagram of an example, non-limiting conveyance means that translocate a roller across a microfluidic chip to pressurize fluid flow amongst one or more nanofluidic chips in accordance with one or more embodiments described herein.

FIG. 8A illustrates a diagram of the example, non-limiting system 100 utilizing a first conveyance method to facilitate translocation of the one or more rollers 102 across the one or more microfluidic cards 104. Repetitive description of like elements employed in other embodiments described herein is omitted for sake of brevity. As shown in FIG. 8A, translocation of the one or more rollers 102 can be facilitated by advancing the one or more rollers 102 along a conveyance path (e.g., represented by the "C" arrow in FIG. 8A) while the one or more microfluidic cards 104 remain in a fixed position.

Figure 8B:
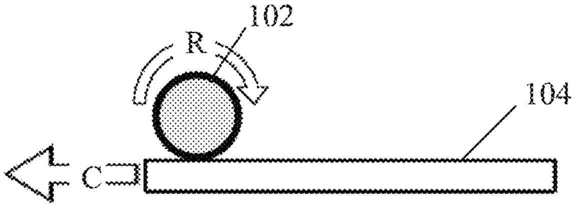
FIG. 8B illustrates a diagram of an example, non-limiting conveyance means that translocate a roller across a microfluidic chip to pressurize fluid flow amongst one or more nanofluidic chips in accordance with one or more embodiments described herein.

FIG. 8B illustrates a diagram of the example, non-limiting system 100 utilizing a second conveyance method to facilitate translocation of the one or more rollers 102 across the one or more microfluidic cards 104. Repetitive description of like elements employed in other embodiments described herein is omitted for sake of brevity. As shown in FIG. 8B, translocation of the one or more rollers 102 can be facilitated by advancing the one or more microfluidic cards 104 along a conveyance path (e.g., represented by the "C" arrow in FIG. 8A) while the one or more rollers 102 can remain in a fixed position.

Figure 8C:
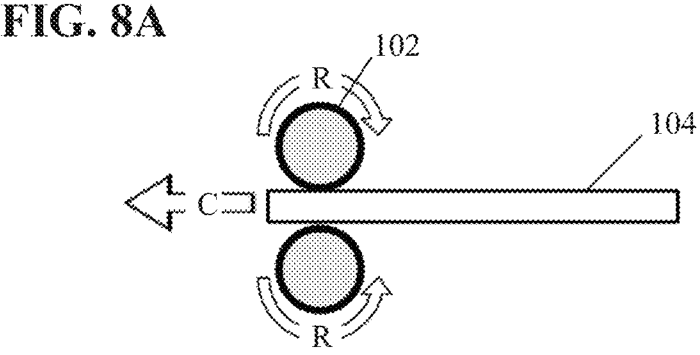
FIG. 8C illustrates a diagram of an example, non-limiting conveyance means that translocate a roller across a microfluidic chip to pressurize fluid flow amongst one or more nanofluidic chips in accordance with one or more embodiments described herein.

FIG. 8C illustrates a diagram of the example, non-limiting system 100 utilizing a third conveyance method to facilitate translocation of the one or more rollers 102 across the one or more microfluidic cards 104. Repetitive description of like elements employed in other embodiments described herein is omitted for sake of brevity. As shown in FIG. 8C, translocation of the one or more rollers 102 can be facilitated by advancing the one or more microfluidic cards 104 along a conveyance path (e.g., represented by the "C" arrow in FIG. 8A) while two or more rollers 102 can remain in a fixed position. Further, the third conveyance method depicted in FIG. 8C can comprise a first roller 102 positioned adjacent to a top side of the one or more microfluidic cards 104 and/or a second roller 102 positioned adjacent to a bottom side of the one or more microfluidic cards 104.

Figure 9:
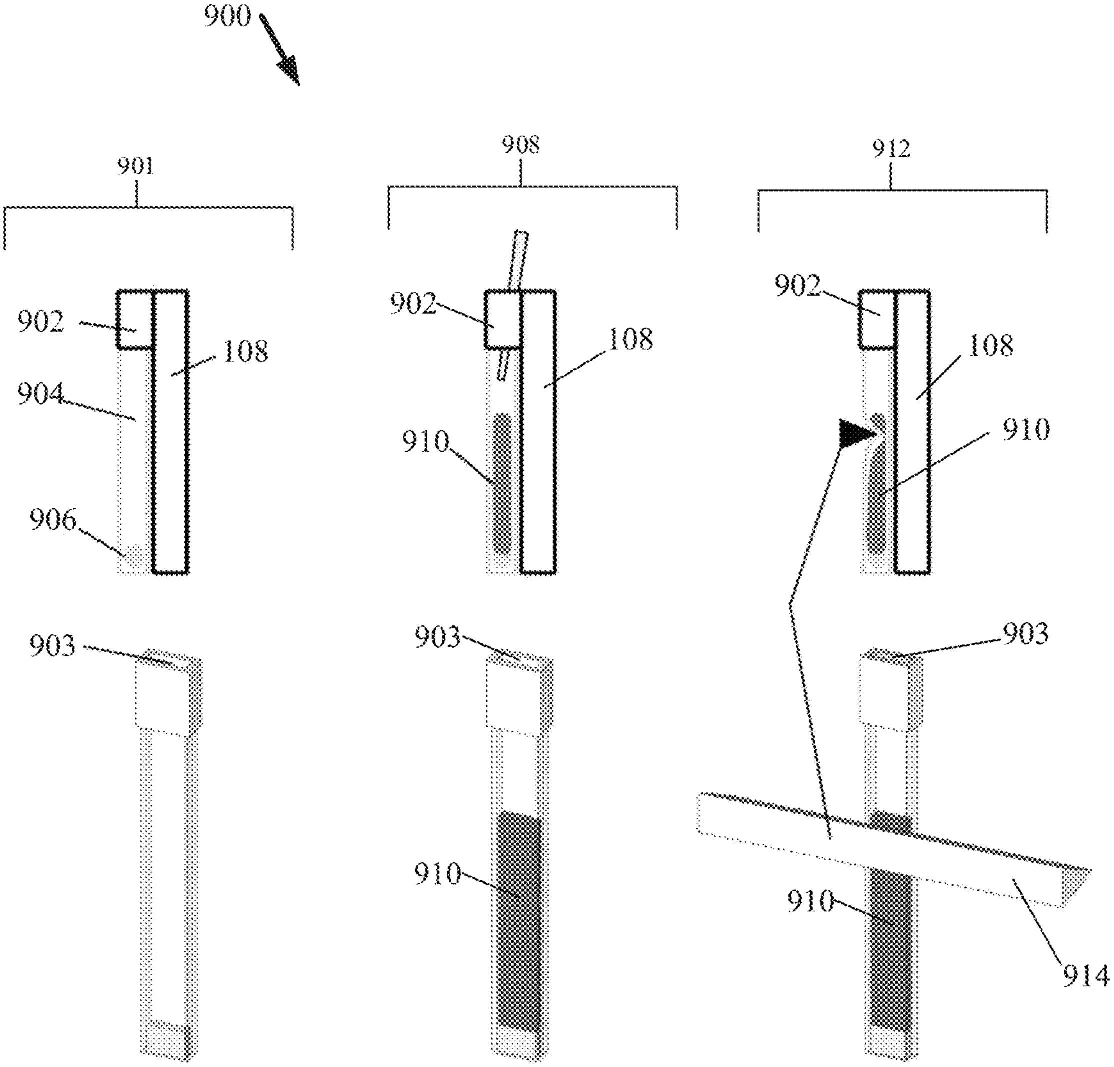
FIG. 9 illustrates a diagram of an example, non-limiting inlet device that can supply fluid to a microfluidic card comprising one or more nanofluidic chips in accordance with one or more embodiments described herein.

FIG. 9 illustrates a diagram of an example, non-limiting first inlet device 900 that can facilitate loading one or more sample fluids into the one or more microfluidic cards 104 in accordance with one or more embodiments described herein. Repetitive description of like elements employed in other embodiments described herein is omitted for sake of brevity. In various embodiments, one or more sample fluids can be loaded onto the one or more microfluidic cards 104 by an operator (e.g., and/or an automated system) prior to operating the system 100. When loading the one or more sample fluids, the admittance of air into the one or more microfluidic cards 104 can be avoided using the first inlet device 900.

As shown in the first scene 901 of FIG. 9, the one or more microfluidic cards 104 can be placed vertically. A small holder 902 can be used to provide a rigid frame for keeping an opening 903 in the elastic membrane 110. The holder 902 can be sealed prior to operation of the system 100 to prevent evaporation and/or contamination of the sample fluid. The opening 903 maintained by the holder 902 can be part of an inlet channel 904 that can be patterned into the clastic membrane 110 (e.g., a fluid conduit defined by the elastic membrane 110). The inlet channel 904 can be in fluid communication with an input reservoir 112 on the substrate 108. In one or more embodiments wherein the one or more microfluidic cards 104 can be primed (e.g., wetted) prior to operation of the system 100, a small amount of priming fluid 906 can be present in a downstream portion of the inlet channel 904 as shown in the first scene 901.

As shown in the second scene 908 of FIG. 9, one or more fluidic samples 910 can be injected into the inlet channel 904, through the holder 902 (e.g. with a pipet and/or needle as depicted in FIG. 9), filling the inlet channel 904. As shown in the third scene 912 of FIG. 9, when the inlet channel 904 is filled to the desired and/or denoted volume, one or more clamps 914 can be applied to pinch off the inlet channel 904. The one or more clamps 914 can be applied below the fluid meniscus of the fluidic sample 910, such that no air is capture on the downstream side of the pinch point. The one or more clamps 914 can generate a force greater than the maximum expected force from the one or more rollers 102.

Alternatively, the inlet channel 904 can be evacuated by putting a vacuum on the opening 903 and/or quickly thermal sealing the inlet channel 904 before the fluid is evacuated out. A thermal seal can be used to make a robust bond that will not break during pressurization. The one or more clamps 914 can be inset into the microfluidic card 104 to prevent contact with the one or more rollers 102, and/or the one or more rollers 102 can be positioned downstream of the one or more clamps 914 and then lowered to begin operation of the system 100. The length of the inlet channel 904 can be selected for the volume of fluidic sample 910 required for injection into the microfluidic card 104. Also, the inlet channel 904 can be made longer than necessary, and any fluid in the inlet channel 904 can be pushed and concentrated to an input reservoir 112 by the action of the one or more rollers 102 upstream.

Figure 10:
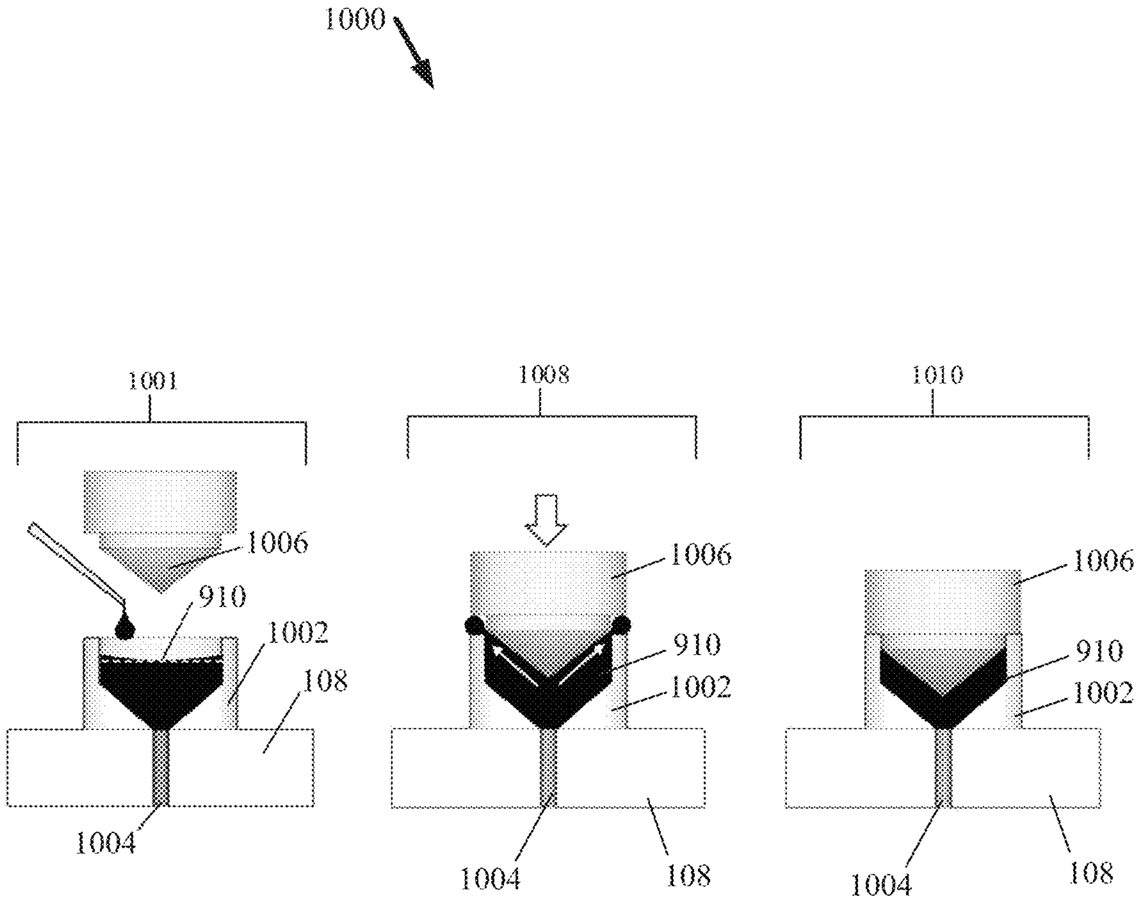
FIG. 10 illustrates a diagram of an example, non-limiting inlet device that can supply fluid to a microfluidic card comprising one or more nanofluidic chips in accordance with one or more embodiments described herein.

FIG. 10 illustrates a diagram of an example, non-limiting second inlet device 1000 that can facilitate loading one or more sample fluids into the one or more microfluidic cards 104 in accordance with one or more embodiments described herein. Repetitive description of like elements employed in other embodiments described herein is omitted for sake of brevity. When loading the one or more sample fluids, the admittance of air into the one or more microfluidic cards 104 can also be avoided using the first inlet device 900.

A first scene 1001 of FIG. 10 can show an alternative structure for introducing fluidic sample 910 into the one or more microfluidic cards 104 without entraining air. An open port 1002 with a tapered bottom can be positioned over another inlet channel 1004 to an input reservoir 112. The port 1002 can have a complimentary shape to a that of a plug 1006, as shown in FIG. 10. For example, the port 1002 can be located on the backside of the microfluidic card 104 and can facilitate fluidic sample injections up into an input reservoir 112. Fluidic sample 910 can be added (e.g., via a pipette and/or needle as depicted in FIG. 10) to a set fill level (e.g., represented by the dashed line in FIG. 10) in the cavity of the port 1002.

As shown in the second scene 1008 of the FIG. 10, the plug 1006 can then be secured (e.g., via screwing, clamping, magnetic attraction, adhesion, a combination thereof, and/or the like) mechanically on top of the port 1002. As shown in the third scene 1010 of FIG. 10, the plug 1006 can have a cone-shaped bottom that can be shallower than the depth of the port 1002. As the plug 1006 is inserted into the port 1002, the cone-shaped bottom can push a small amount of fluidic sample 910 up and to the edge of the port 1002 (e.g., as shown in the second scene 1008), thereby excluding air within the port 1002. Example materials that can comprise the port 1002 can include, but are not limited to: plastics, composites, a combination thereof, and/or like. In one or more embodiments, the port 1002 can comprise a polycarbonate and/or a cyclical-olefin co-polymer. Example materials that can comprise the plug 1006 can include, but are not limited to: plastics, composites, biomedical grade polyether ether ketones, polyethylene, polypropylene, a combination thereof, and/or the like.

Figure 11:
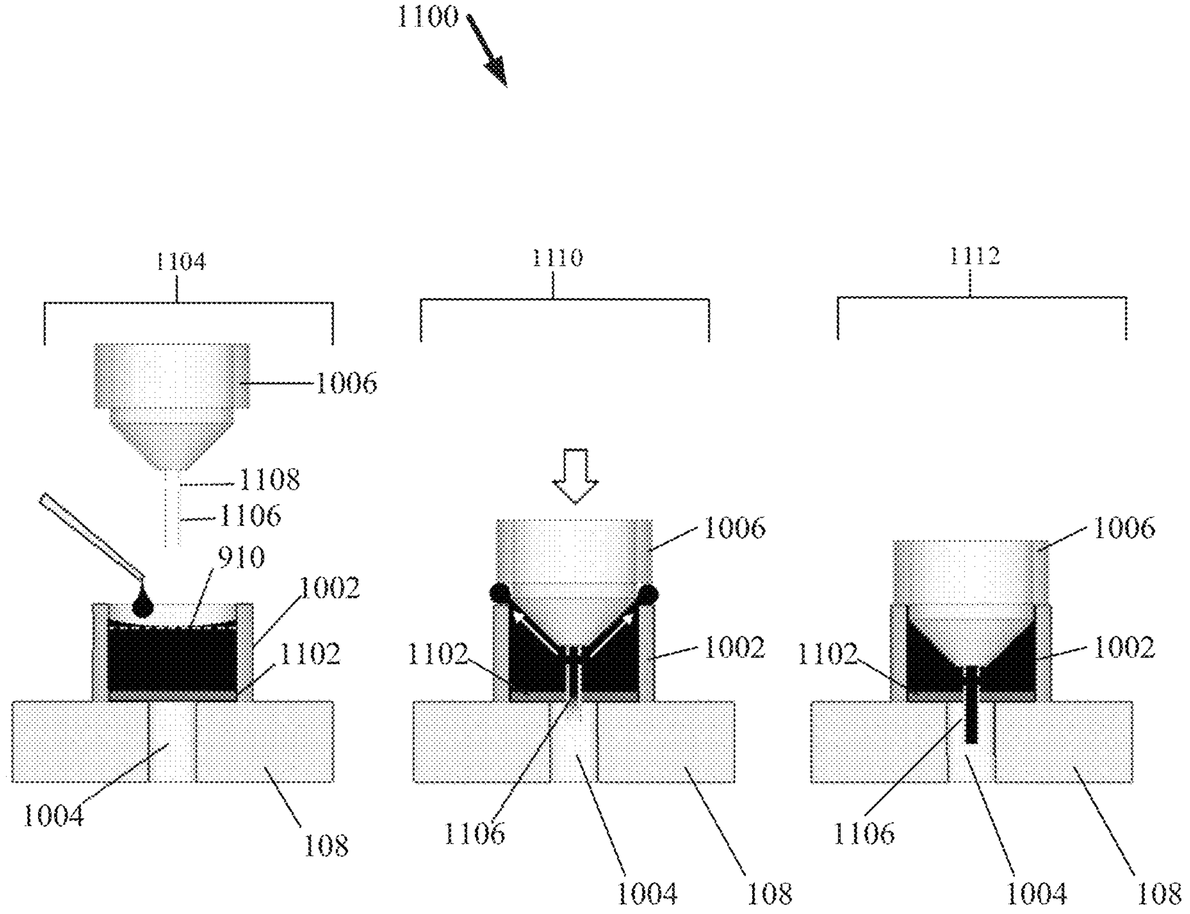
FIG. 11 illustrates a diagram of an example, non-limiting inlet device that can supply fluid to a microfluidic card comprising one or more nanofluidic chips in accordance with one or more embodiments described herein.

FIG. 11 illustrates a diagram of an example, non-limiting third inlet device 1100 that can facilitate loading one or more sample fluids into the one or more microfluidic cards 104 in accordance with one or more embodiments described herein. Repetitive description of like elements employed in other embodiments described herein is omitted for sake of brevity. The third inlet device 1100 can comprise a structure derivative of the second inlet device 1000, wherein the other inlet channel 1004 can be covered by one or more protective membranes 1102. Example materials that can comprise the protective membrane 1102 can include, but are not limited to: foil, a plastic film, a metal foil, an elastomer film, an aluminum foil, a waterproof paper film, a wax plug, a composite film, a combination thereof, and/or the like.

As shown in the first scene 1104 of FIG. 11, the plug 1006 can comprise a needle 1106 extending from the bottom surface of the plug 1006. Further, the needle 1106 can be comprise a fluted body. For instance, the needle 1106 can comprise one or more holes 1108, as shown in FIG. 11. As described herein with regards to FIG. 10, one or more fluidic samples 910 can be inserted into the port 1002, wherein the port 1002 can have a rectangular shape (e.g., as depicted in FIG. 11). As shown in the second scene 1110 of FIG. 11, the plug 1006 can then be inserted into the port 1002, wherein the needle 1106 can pierce the one or more protective membrane 1102; thereby, letting fluidic sample 910 into the other inlet channel 1004. Additionally, the cone-shaped taper of the plug 1006 can force can facilitate evacuation of air contained in the port 1002 as the plug 1006 is inserted. Further, as shown in the third scene 1112 of FIG. 11, the one or more holes 1108 within the needle 1106 can facilitate fluid communication of fluidic sample 910 contained within the port 1002 across the one or more protective membranes 1102.

One of ordinary skill in the art will recognize that any of the first inlet device 900, the second inlet device 1000, and/or the third inlet device 1100 can be implemented with the various embodiments of the microfluidic cards 104 described herein to facilitate operation of the system 100. Further, loading of the one or more microfluidic cards 104 is not limited to use of the first inlet device 900, the second inlet device 1000, and/or the third inlet device 1100 described herein. Rather, one or more microfluidic cards 104 can be loaded by any means that inhibits entrance of air into the one or more microfluidic cards 104.

Figure 12:
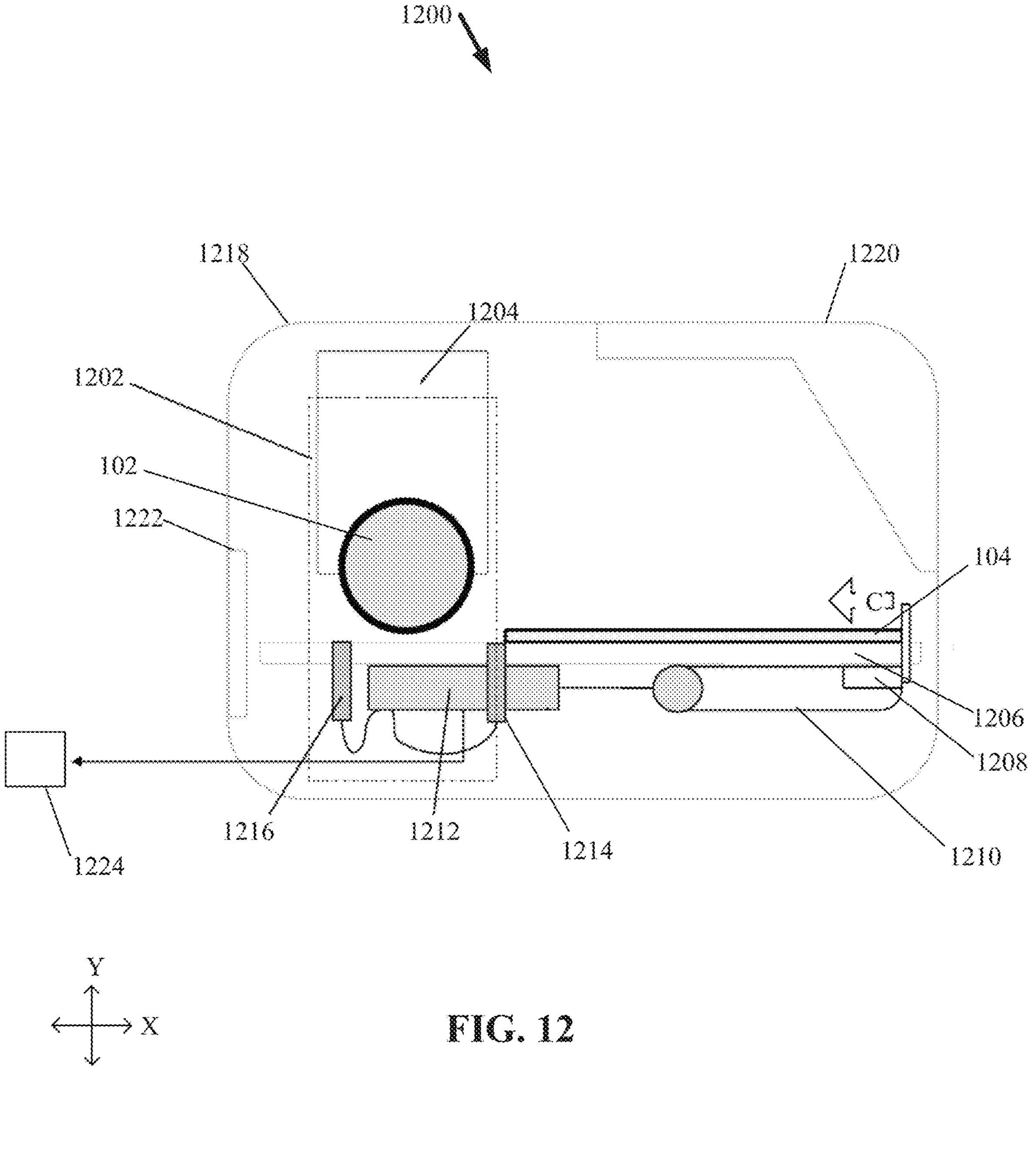
FIG. 12 illustrates a diagram of an example, non-limiting apparatus that can house and/or operate a system that can utilize translocation of a roller of a microfluidic card to sequentially drive fluid flow amongst one or more nanofluidic chips in accordance with one or more embodiments described herein.

FIG. 12 illustrates a diagram of an example, non-limiting cross-sectional view of an apparatus 1200 that can facilitate operation of the system 100 in accordance with one or more embodiments described herein. Repetitive description of like elements employed in other embodiments described herein is omitted for sake of brevity.

As shown in FIG. 12, the apparatus 1200 can comprise the one or more rollers 102 fixed to an assembly 1202, which can include a gearbox and/or motor positioned within a housing 1204 for providing mechanical force to the one or more rollers 102 and/or up-shifting the torque on the one or more roller 102 (e.g., adjusting the pressure applied by the one or more rollers 102). The roller assembly 1202 can be set such that the one or more rollers 102 can translocate up and/or down (e.g., along the "Y" axis shown in FIG. 12), to avoid contacting features of the one more microfluidic cards 104 that should not be pressed by the one or more rollers 102 as the one or more microfluidic cards 104 proceed along a conveyance path (e.g., represented by the "C" arrow in FIG. 12).

The one or more microfluidic cards 104 can be inserted onto a holder plate 1206 that can provide a rigid support for holding the one or more microfluidic cards 104 and/or guiding the one or more microfluidic cards 104 to the one or more rollers 102. As shown in FIG. 12, a loading tab 1208, connected to a belt assembly 1210 (e.g., a motorized belt system), can be used to convey the one or more microfluidic cards 104 along the conveyance path (e.g., represented by the "C" arrow). The motorized belt assembly 1210 and/or the loading tab 1208 can be electrically connected to one or more controllers 1212. For example, the one or more controllers 1212 can comprise a microcontroller, a computer, an electronic processor, a combination thereof, and/or the like. Further, the one or more controllers 1212 can be operably connected to the gearbox and/or motor positioned within the house 1204. The one or more controllers 1212 can control operation of the one or more rollers 102, the belt assembly 1210, and/or the loading tab 1208.

The apparatus 1200 can further comprise one or more first edge sensors 1214 and/or one or more second edge sensors 1216. The one or more first edge sensors 1214 and/or one or more second edge sensors 1216 can facilitate determining the position of the one or more microfluidic cards 104 along the conveyance path (e.g., represented by the "C" arrow shown in FIG. 12). For example, the one or more first edge sensors 1212 can be positioned before the one or more rollers 102 along the conveyance path, while the one or more second edge sensors 1214 can be positioned after the one or more rollers 102 along the conveyance path. The one or more first edge sensors 1214 and/or one or more second edge sensors 1216 can be contact sensors and/or optical sensors. Further, the one or more first edge sensors 1214 and/or one or more second edge sensors 1216 can read the edges of the one or more microfluidic cards 104 based on physical features and/or patterns (e.g., edges, holes, electrodes, and/or tabs comprising the substrate 108, the back film 124, and/or the clastic membrane 110) that can characterize the one or more microfluidic cards 104. In one or more embodiments, the one or more first edge sensors 1214 and/or one or more second edge sensors 1216 can detect a beginning of a microfluidic card 104, and end of a microfluidic card 104, and/or another point of interest on the one or more microfluidic cards 104.

In one or more embodiments, the one or more controllers 1212 can further be operably coupled to the one or more first edge sensors 1214 and/or one or more second edge sensors 1216. Additionally, the one or more controllers 1212 can store computer programs and/or perform a feed-back analysis based on one or more detections of the one or more first edge sensors 1214 and/or one or more second edge sensors 1216. Example operations that the one or more controllers 1212 can command can include, but are not limited to: energize the one or more rollers 102, alter rotation of the one or more rollers 102, modulate speed of the one or more rollers 102, engage and/or disengage the one or more rollers 102 to contact the elastic membrane 110, power a motor for extending and/or retracting the loading tab 1208, receive one or more inputs from the one or more first edge sensors 1214 and/or second edge sensors 1216, receive input from a user of the apparatus 1200, transmit data to an external computer, a combination thereof, and/or the like.

Additionally, the various features of the apparatus 1200 can be protected within an enclosure 1218. The enclosure 1218 can comprise a hatch 1220 that can be opened and/or lifted to accesses an inside of the enclosure 1218. For example, an operator of the apparatus 1200 can lift the hatch 1220 to deposit one or more microfluidic cards 104 onto the holder plate 1206 for processing by the system 100. Further, the enclosure 1218 can comprise an output slot 1222 positioned at an end of the conveyance path of the one or more microfluidic cards 104. For example, the one or more microfluidic cards 104 can be guided (e.g., by the belt assembly at the command of the one or more controllers 1212) under the one or more rollers 102 and to the output slot 1222 whereupon the one or more processed microfluidic cards 104 can exit the enclosure 1218. Example materials that can comprise the enclosure 1218 can include, but are not limited to: plastics, metals, composites, metal alloys, a combination thereof, and/or the like. Furthermore, in one or more embodiments, the one or more controllers 1212 can be operably coupled to one or more external controls 1224 as depicted in FIG. 12. For example, the one or more controllers 1212 and the one or more external controls 1224 can be coupled by a direct electrical connection (e.g., by wiring) and/or by one or more networks (e.g., via one or more cloud computing environments).

Figure 13:
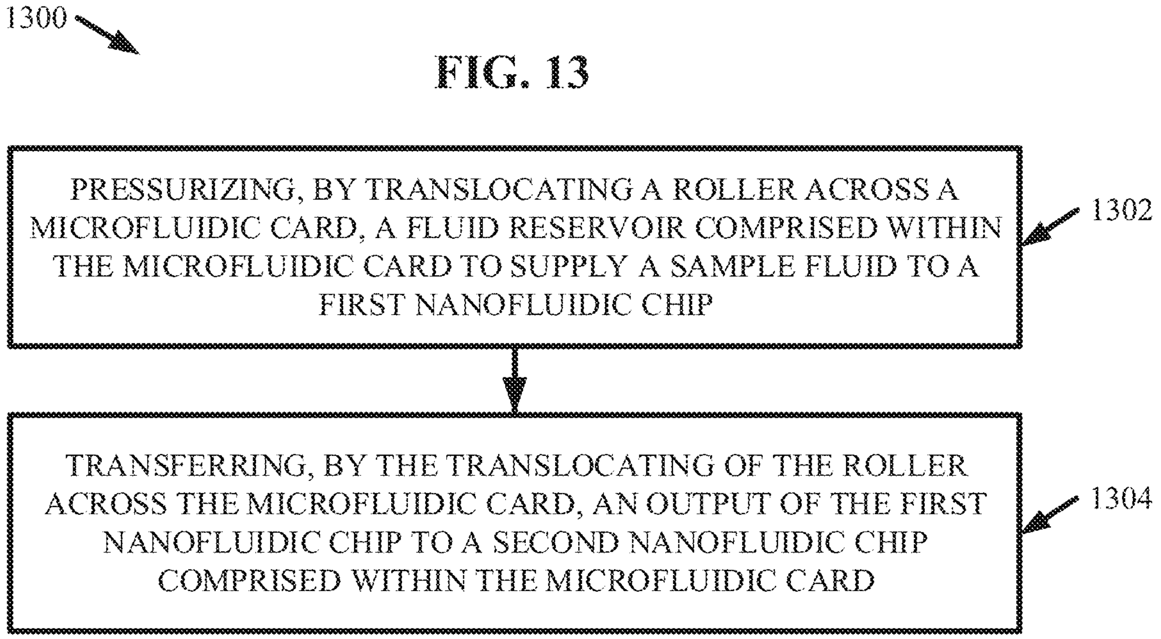
FIG. 13 illustrates a flow diagram of an example, non-limiting method that can facilitate utilizing translocation of a roller of a microfluidic card to sequentially drive fluid flow amongst one or more nanofluidic chips in accordance with one or more embodiments described herein.

FIG. 13 illustrates a flow diagram of an example, non-limiting method 1300 that can facilitate performing multiple nanofluidic processing stages by translocating one or more rollers 102 over one or more microfluidic cards 104 in accordance with one or more embodiments described herein. Repetitive description of like elements employed in other embodiments described herein is omitted for sake of brevity.

At 1302, the method 1300 can comprise pressurizing, by translocating one or more rollers 102 across one or more microfluidic cards 104, one or more fluid reservoirs (e.g., one or more input reservoirs 112) comprised within the one or more microfluidic cards 104 to supply one or more sample fluids to a first nanofluidic chip 106. For example, the pressurizing at 1302 can be performed in accordance with operation of the system 100 at the first stage 302 of the one or more microfluidic cards 104 described herein. For instance, the pressurizing at 1302 can be performed in accordance with the first scene 402 of FIG. 4 described herein. In one or more embodiments, the one or more fluid reservoirs (e.g., one or more input reservoirs 112) can be defined by one or more elastic membranes 110 comprised within the one or more microfluidic cards 104. Further, translocating the one or more rollers 102 can contact the one or more fluid reservoirs (e.g., one or more input reservoirs 112) and deform the structure of the fluid reservoirs (e.g., one or more input reservoirs 112); thereby pressurizing the fluid reservoirs (e.g., one or more input reservoirs 112).

At 1304, the method 1300 can comprise transferring, by the translocating of the one or more rollers 102 across the one or more microfluidic cards 104, one or more outputs of the first nanofluidic chip 106 to one or more second nanofluidic chips 106 comprised within the microfluidic card 104. For example, the transferring at 1304 can be performed in accordance with operation of the system 100 from the first stage 302 to the second stage 304 of the one or more microfluidic cards 104 described herein. For instance, the transferring at 1304 can be performed in accordance with the second scene 404 of FIG. 4 described herein. In one or more embodiments, pressurizing at 1302 and/or the transferring at 1304 can be performed in accordance with a time-sequence established by the translocating the one or more rollers 102 across the one or more microfluidic cards 104. For example, translocating the one or more rollers 102 across the one or more can initiate multiple processing stages (e.g., a processing stage executed by each nanofluidic chip 106) in a sequential order established by the arrangement of nanofluidic chips 106 on the one or more microfluidic cards 104. In other words, the one or more rollers 102 can enable the operation of multiple nanofluidic chips 106 in an automated sequence driven by the translocation of the one or more rollers 102 across the one or more microfluidic cards 104.

In one or more embodiments, the method 1300 can comprise facilitating the translocation of the one or more rollers 102 across the one or more microfluidic cards 104 by conveying the one or more rollers 102 along a conveyance path while keeping the one or more microfluidic cards 104 in a fixed position (e.g., as depicted in FIG. 8A). Additionally, or alternatively, in one or more embodiments the method 1300 can comprise facilitating the translocation of the one or more rollers 102 across the one or more microfluidic cards 104 by conveying the one or more microfluidic cards 104 along a conveyance path while keeping the one or more rollers 102 in a fixed position (e.g., as depicted in FIG. 8B). Further, in various embodiments, various embodiments of the method 1300 and/or the system 100 described herein can be facilitated by operation of the apparatus 1200 described herein. For example, the method 1300 can be automated, wherein the one or more controllers 1212 can control operation of the one or more rollers 102 and/or conveyance of the one or more microfluidic cards 104 to achieve the pressurizing at 1302 and/or the transferring at 1304.

Figure 14:
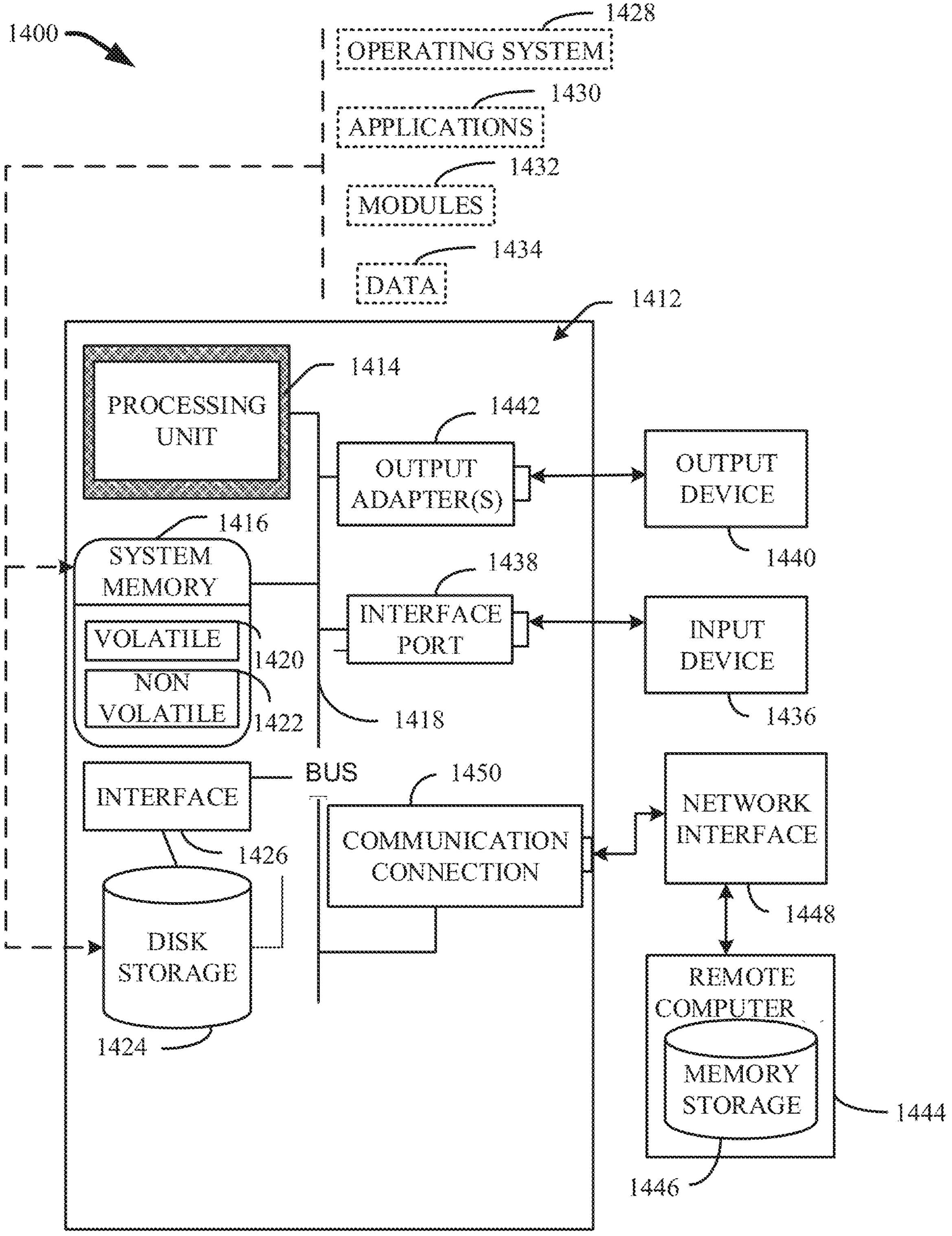
FIG. 14 illustrates a block diagram of an example, non-limiting operating environment in which one or more embodiments described herein can be facilitated.

In order to provide a context for the various aspects of the disclosed subject matter, FIG. 14 as well as the following discussion are intended to provide a general description of a suitable environment in which the various aspects of the disclosed subject matter can be implemented. FIG. 14 illustrates a block diagram of an example, non-limiting operating environment 1400 in which one or more embodiments described herein can be facilitated. Repetitive description of like elements employed in other embodiments described herein is omitted for sake of brevity. For example, the one or more controllers 1212 and/or systems 100 described herein can be facilitated by one or more features of the operating environment 1400 depicted in FIG. 14. With reference to FIG. 14, a suitable operating environment 1400 for implementing various aspects of this disclosure can include a computer 1412. The computer 1412 can also include a processing unit 1414, a system memory 1416, and a system bus 1418. The system bus 1418 can operably couple system components including, but not limited to, the system memory 1416 to the processing unit 1414. The processing unit 1414 can be any of various available processors. Dual microprocessors and other multiprocessor architectures also can be employed as the processing unit 1414. The system bus 1418 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1416 can also include volatile memory 1420 and nonvolatile memory 1422. The basic input/output system (BIOS), containing the basic routines to transfer information between elements within the computer 1412, such as during start-up, can be stored in nonvolatile memory 1422. By way of illustration, and not limitation, nonvolatile memory 1422 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 1420 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1412 can also include removable/non-removable, volatile/non-volatile computer storage media. FIG. 14 illustrates, for example, a disk storage 1424. Disk storage 1424 can also include, but is not limited to, devices like a magnetic disk drive, floppy disk drive, tape drive, Jaz drive, Zip drive, LS-100 drive, flash memory card, or memory stick. The disk storage 1424 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1424 to the system bus 1418, a removable or non-removable interface can be used, such as interface 1426. FIG. 14 also depicts software that can act as an intermediary between users and the basic computer resources described in the suitable operating environment 1400. Such software can also include, for example, an operating system 1428. Operating system 1428, which can be stored on disk storage 1424, acts to control and allocate resources of the computer 1412. System applications 1430 can take advantage of the management of resources by operating system 1428 through program modules 1432 and program data 1434, e.g., stored either in system memory 1416 or on disk storage 1424. It is to be appreciated that this disclosure can be implemented with various operating systems or combinations of operating systems. A user enters commands or information into the computer 1412 through one or more input devices 1436. Input devices 1436 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1414 through the system bus 1418 via one or more interface ports 1438. The one or more Interface ports

1438 can include, for example, a serial port, a parallel port, a game port, and a universal serial bus (USB). One or more output devices 1440 can use some of the same type of ports as input device 1436. Thus, for example, a USB port can be used to provide input to computer 1412, and to output information from computer 1412 to an output device 1440. Output adapter 1442 can be provided to illustrate that there are some output devices 1440 like monitors, speakers, and printers, among other output devices 1440, which require special adapters. The output adapters 1442 can include, by way of illustration and not limitation, video and sound cards that provide a means of connection between the output device 1440 and the system bus 1418. It should be noted that other devices and/or systems of devices provide both input and output capabilities such as one or more remote computers 1444.

Computer 1412 can operate in a networked environment using logical connections to one or more remote computers, such as remote computer 1444. The remote computer 1444 can be a computer, a server, a router, a network PC, a workstation, a microprocessor based appliance, a peer device or other common network node and the like, and typically can also include many or all of the elements described relative to computer 1412. For purposes of brevity, only a memory storage device 1446 is illustrated with remote computer 1444. Remote computer 1444 can be logically connected to computer 1412 through a network interface 1448 and then physically connected via communication connection 1450. Further, operation can be distributed across multiple (local and remote) systems. Network interface 1448 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1450 refers to the hardware/software employed to connect the network interface 1448 to the system bus 1418. While communication connection 1450 is shown for illustrative clarity inside computer 1412, it can also be external to computer 1412. The hardware/software for connection to the network interface 1448 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an crasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

pressurizing, by translocating a roller across an elastic membrane covering and scaling a microfluidic card, a fluid reservoir comprised within the microfluidic card to supply a sample fluid to a first nanofluidic chip; and transferring, by the translocating the roller across the microfluidic card, an output of the first nanofluidic chip to a second nanofluidic chip comprised within the microfluidic card, wherein the first nanofluidic chip and the second nanofluidic chip on the microfluidic card are structurally arranged in a sequence of a plurality of nanofluidic chips along a length of the microfluidic card, wherein the sequence is an ordered series of stages, wherein the sequence of the first nanofluidic chip and the second nanofluidic chip facilitates processing of the fluid in a sequence, wherein the microfluidic card comprises a substrate having two or more pockets formed as a cavity within a top surface of the substrate and that seats the first nanofluidic card and the second nanofluidic card, wherein the two or more pockets are side by side with one another, and wherein the clastic membrane is disposed over the first nanofluidic chip, the second nanofluidic card and the top surface of the substrate.

2. The method of claim 1, wherein the translocating the roller is performed along a conveyance path to facilitate the translocating the roller across the microfluidic card.

3. The method of claim 1, wherein the translocating the roller comprises translocating the roller along a conveyance path to facilitate the translocating the roller across the microfluidic card.

4. The method of claim 1, further comprising:

pressurizing, by the translocating the roller across the microfluidic card, a second fluid reservoir.

5. The method of claim 4, wherein the second fluid reservoir is comprised within the microfluidic card to supply the output of the first nanofluidic chip to the second nanofluidic chip.

6. The method of claim 1, wherein the pressurizing is performed in the ordered series of stages based on the translocating the roller across the microfluidic card.

7. The method of claim 6, wherein the transferring is performed in the ordered series of stages based on the translocating the roller across the microfluidic card.

8. The method of claim 1, wherein the first nanofluidic chip and the second nanofluidic chip each comprise a plurality of supplemental input fluid reservoirs, and further comprising:

causing to output, by the translocating roller across the microfluidic card, the sample fluid from one or more output reservoirs via a port on a backside of the microfluidic card formed by a hole penetrating through a substrate of the microfluidic card, wherein the backside of the microfluidic chip is a side of opposite the roller.

* * * * *